United States Patent [19]

Rutherford et al.

[11] Patent Number: 4,547,810

[45] Date of Patent: Oct. 15, 1985

[54] PORTABLE FACSIMILE TRANSMITTER

[75] Inventors: David G. Rutherford, Marlboro; Bernd Helling, Old Bridge, both of N.J.; John H. Long, Georgetown, Tex.

[73] Assignee: The Associated Press, East Brunswick, N.J.

[21] Appl. No.: 367,049

[22] Filed: Apr. 9, 1982

[51] Int. Cl.⁴ .................. H04N 1/08; H04N 1/17; H04N 1/40

[52] U.S. Cl. .................. 358/256; 358/264; 358/267; 358/280; 358/288; 358/289; 358/291

[58] Field of Search .............. 358/264, 267, 257, 258, 358/280, 288, 289, 291

[56] References Cited

U.S. PATENT DOCUMENTS

| | | | |
|---|---|---|---|
| 2,378,298 | 6/1945 | Hilferty | 358/258 |
| 2,618,702 | 11/1952 | Thompson | 358/291 |
| 3,201,512 | 8/1965 | Mason et al. | 358/288 |
| 3,414,672 | 12/1968 | Townsend et al. | 358/267 |
| 3,622,698 | 11/1971 | Richeson, Jr. | 358/280 |
| 3,764,741 | 10/1973 | Long | 358/289 |
| 3,781,902 | 12/1973 | Shim et al. | 358/291 |
| 4,112,467 | 9/1978 | Ogawa | 358/257 |
| 4,153,916 | 5/1979 | Miwa et al. | 358/257 |
| 4,187,520 | 2/1980 | Beduchaud et al. | 358/257 |
| 4,280,145 | 1/1981 | Norrell | 358/289 |
| 4,325,086 | 4/1982 | Sato et al. | 358/291 |
| 4,329,717 | 5/1982 | Logie et al. | 358/280 |

Primary Examiner—Joseph A. Orsino, Jr.
Attorney, Agent, or Firm—Arthur L. Lessler

[57] ABSTRACT

A portable facsimile transmitter suitable for use by reporters and photographers in the field, for sending high quality pictures to an unattended remote receiver, by telephone or wireless. A rotating drum to which the original is affixed is initially scanned at a rapid rate to establish the photodetector operating level so as to maximize the signal dynamic range. After the initial scan the picture is scanned at one of three selectable rates (determined by setting the drum speed), and the video output of the photodetector is modulated and coupled to the transmission line. The original is affixed to the drum by means of a fixed (with respect to the drum) clamp and a movable clamp at each end thereof. A tab extends from an end of each clamp, and the position of each tab is sensed to provide a synchronization signal so that the picture is centered at the remote receiver. A protective circuit begins to measure the drum rotation speed a predetermined time after scanning begins, and terminates transmission if the speed is improper. Picture transmission can be initiated by a command signal from the remote receiver. A reference code identifying the particular transmitter and the place of transmission can be transmitted with each picture.

56 Claims, 13 Drawing Figures

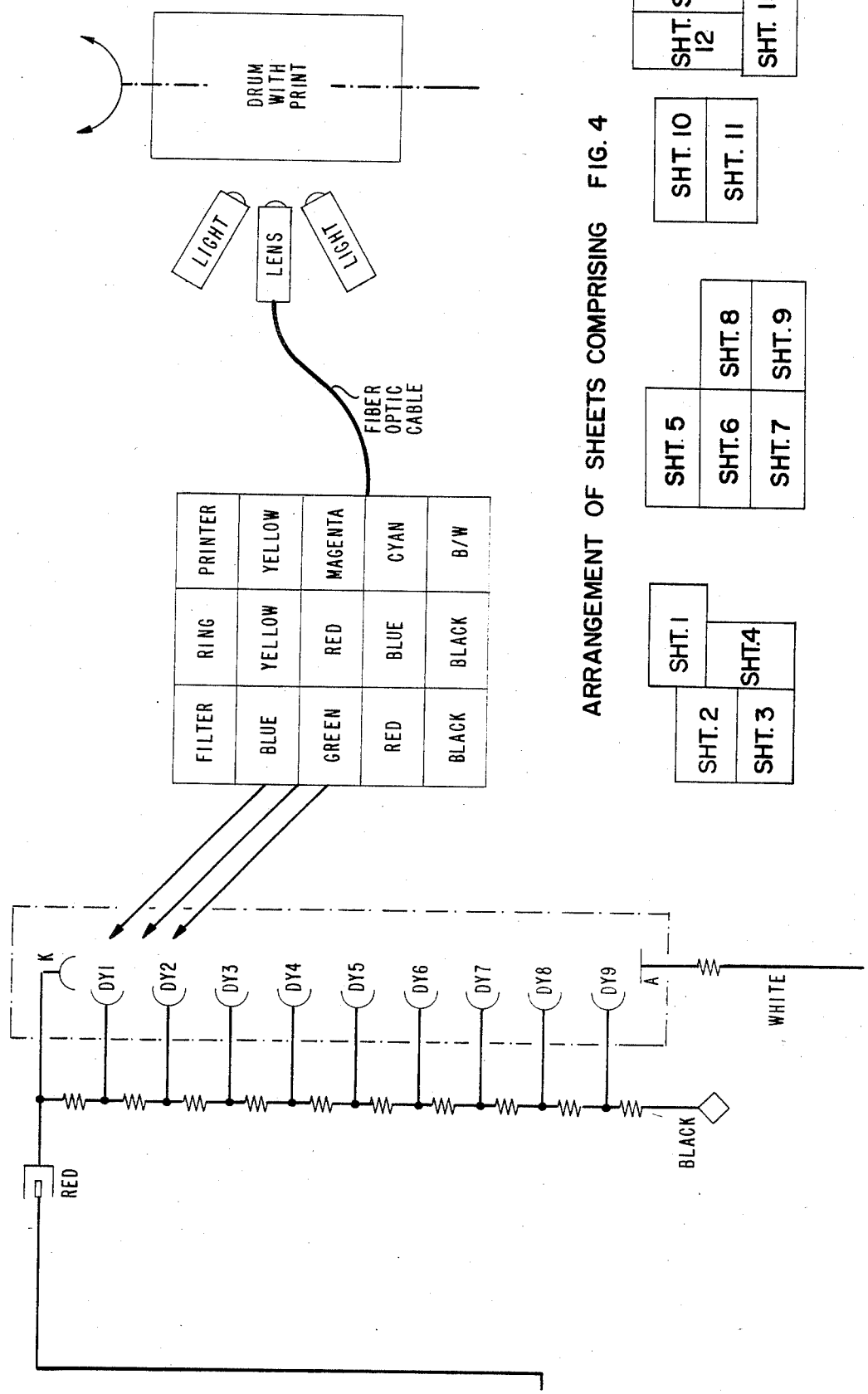

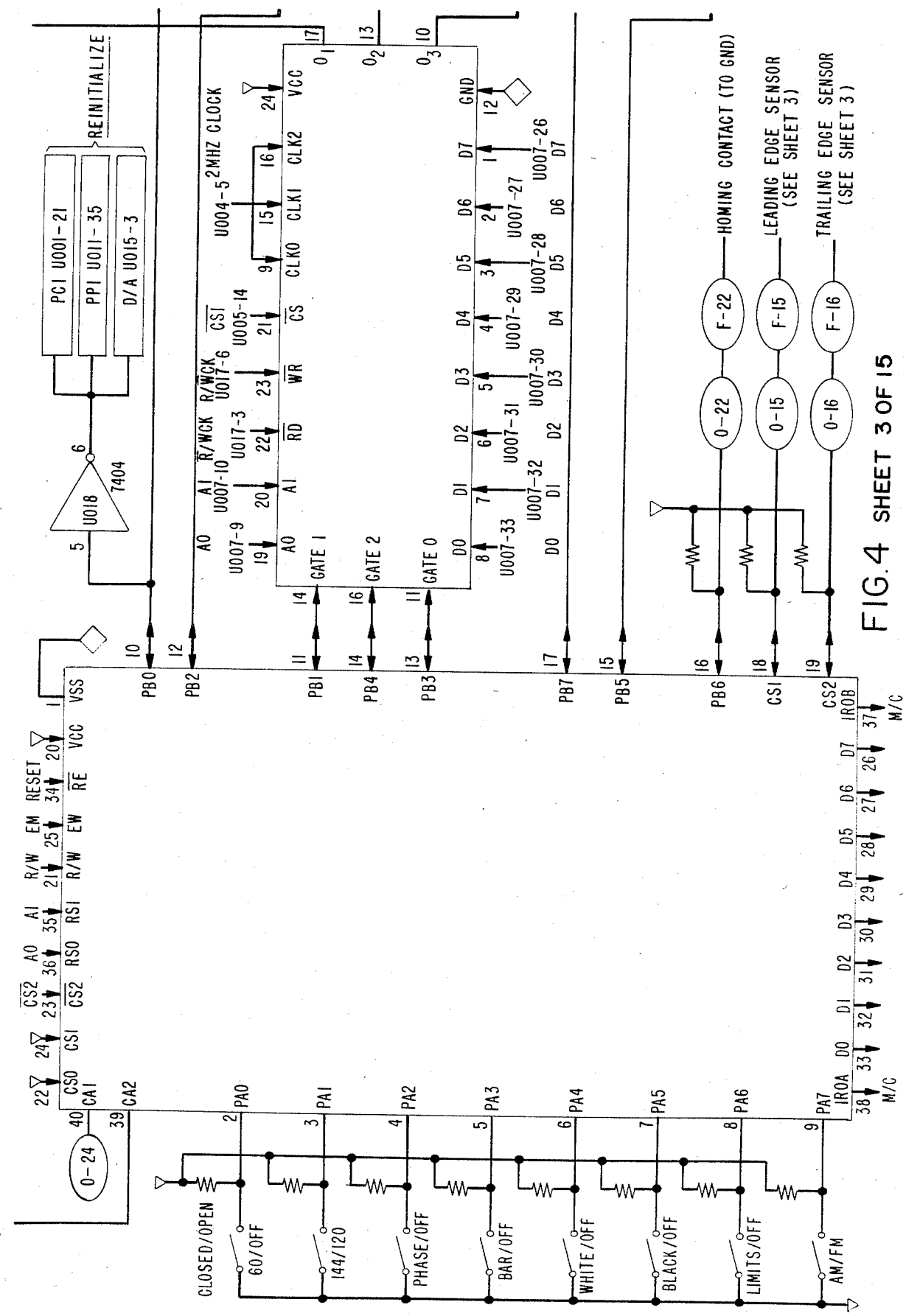
FIG. 4 SHEET 3 OF 15

TRI-STATE BIDIRECTIONAL DATA BUS INTEGRATED CIRCUITS IN NUMERICAL ORDER

- ERASABLE PROGRAMMABLE MEMORY #1 — EPROM #1-2716-U003-9,10,11,13,14,15,16,17
- ERASABLE PROGRAMMABLE MEMORY #2 — EPROM #2-2716-U002-9,10,11,13,14,15,16,17
- PERIPHERAL INTERFACE ADAPTER #1 — PIA #1-6821-U008-33,32,31,30,29,28,27,26
- PERIPHERAL INTERFACE ADAPTER #2 — PIA #2-6821-U009-33,32,31,30,29,28,27,26
- PROGRAMMABLE COMMUNICATION INTERFACE — PCI-8251-U001-27,28,1,2,5,6,7,8
- PROGRAMMABLE INTERVAL TIMER — PIT-8253-U010-8,7,6,5,4,3,2,1
- PROGRAMMABLE PERIPHERAL INTERFACE — PPI-8255-U011-34,33,32,31,30,29,28,27

| EPROM#1 | EPROM#2 | PIA#1 | PIA#2 | PCI | PIT | PPI |
|---|---|---|---|---|---|---|
| U003-8 | U002-8 | U008-36 | U009-36 | U001-12 | U010-19 | U011-9 |
| U003-7 | U002-7 | UC08-35 | U009-35 | | U010-20 | U011-8 |
| U003-6 | U002-6 | | | | | |
| U003-5 | U002-5 | | | | | |
| U003-4 | U002-4 | | | | | |
| U003-3 | U002-3 | | | | | |
| U003-2 | U002-2 | | | | | |
| U003-1 | U002-1 | | | | | |
| U003-23 | U002-23 | | | | | |
| U003-22 | U002-22 | | | | | |
| U003-19 | U002-19 | | | | | |

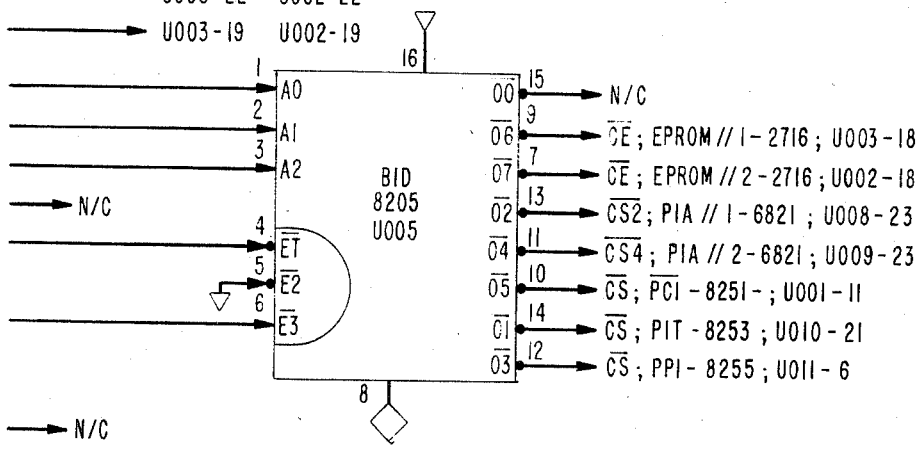

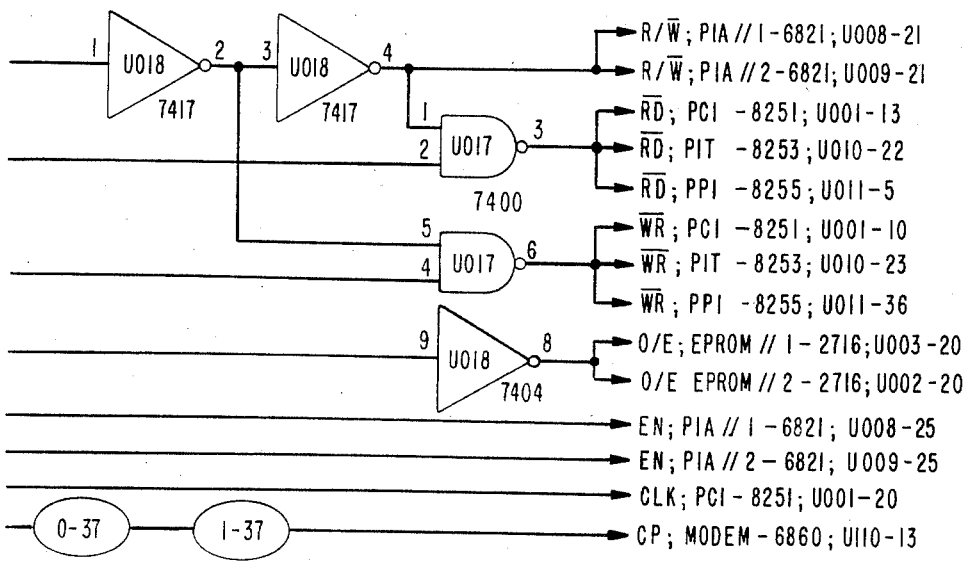

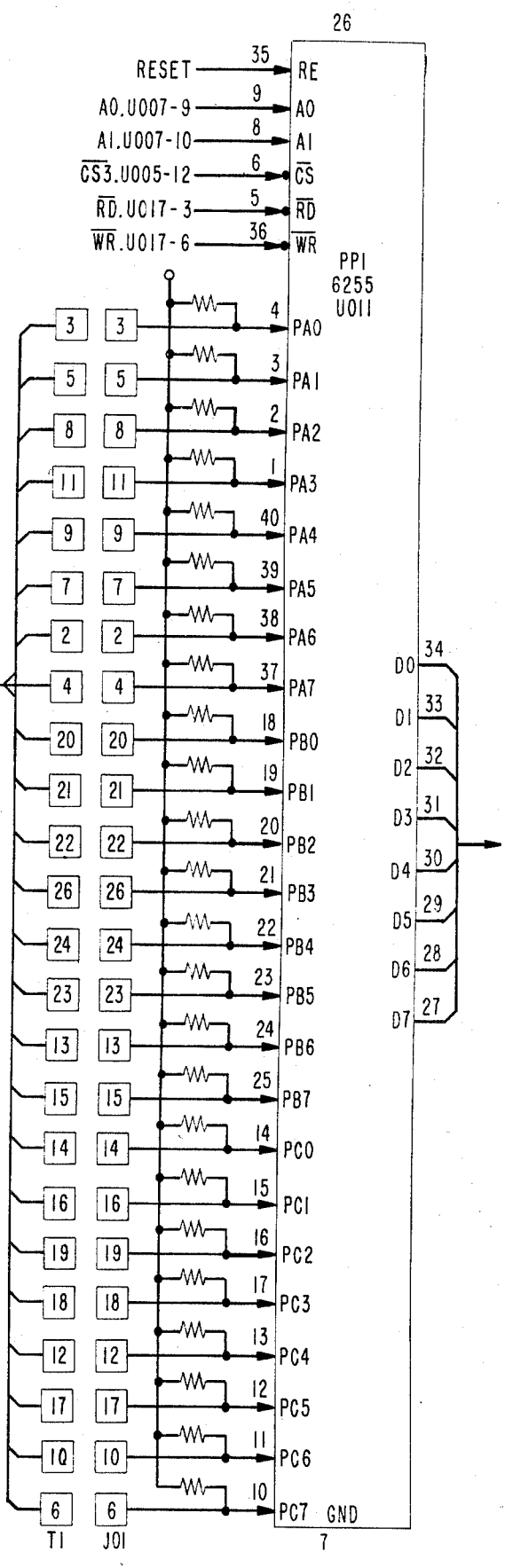
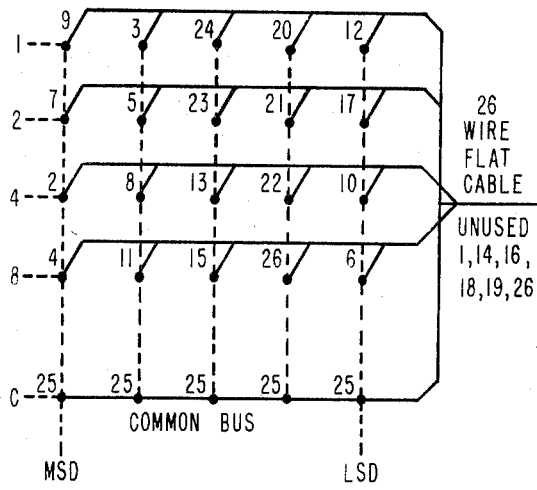
FIG. 4
SHEET 14 OF 15

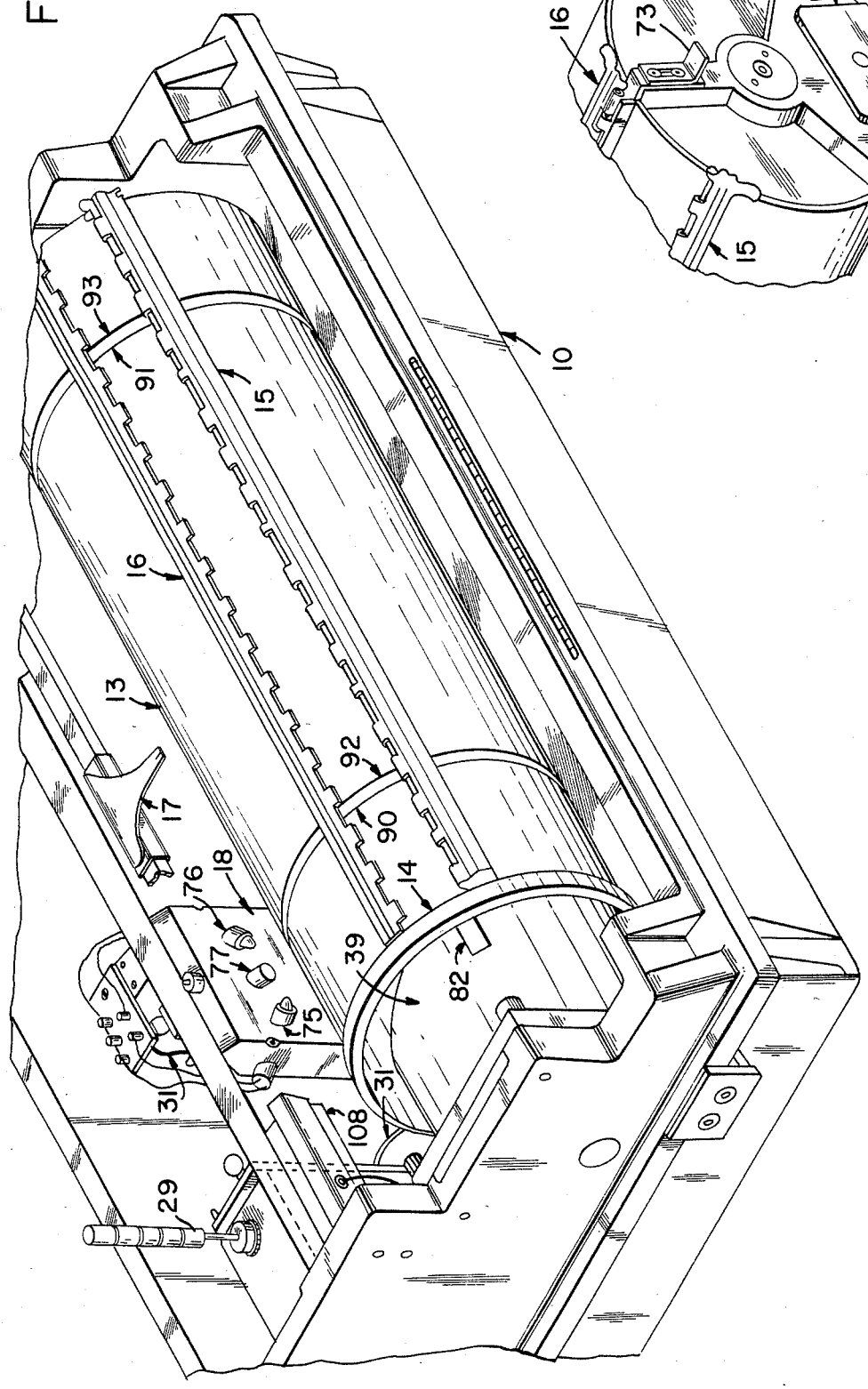

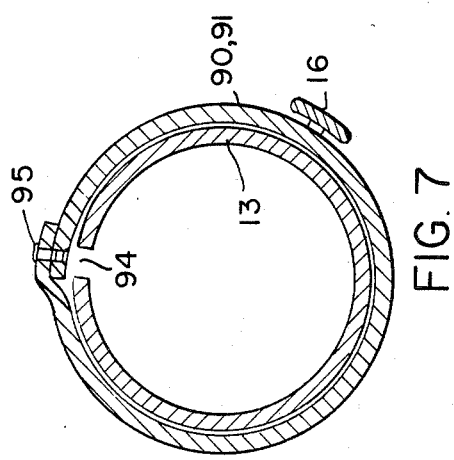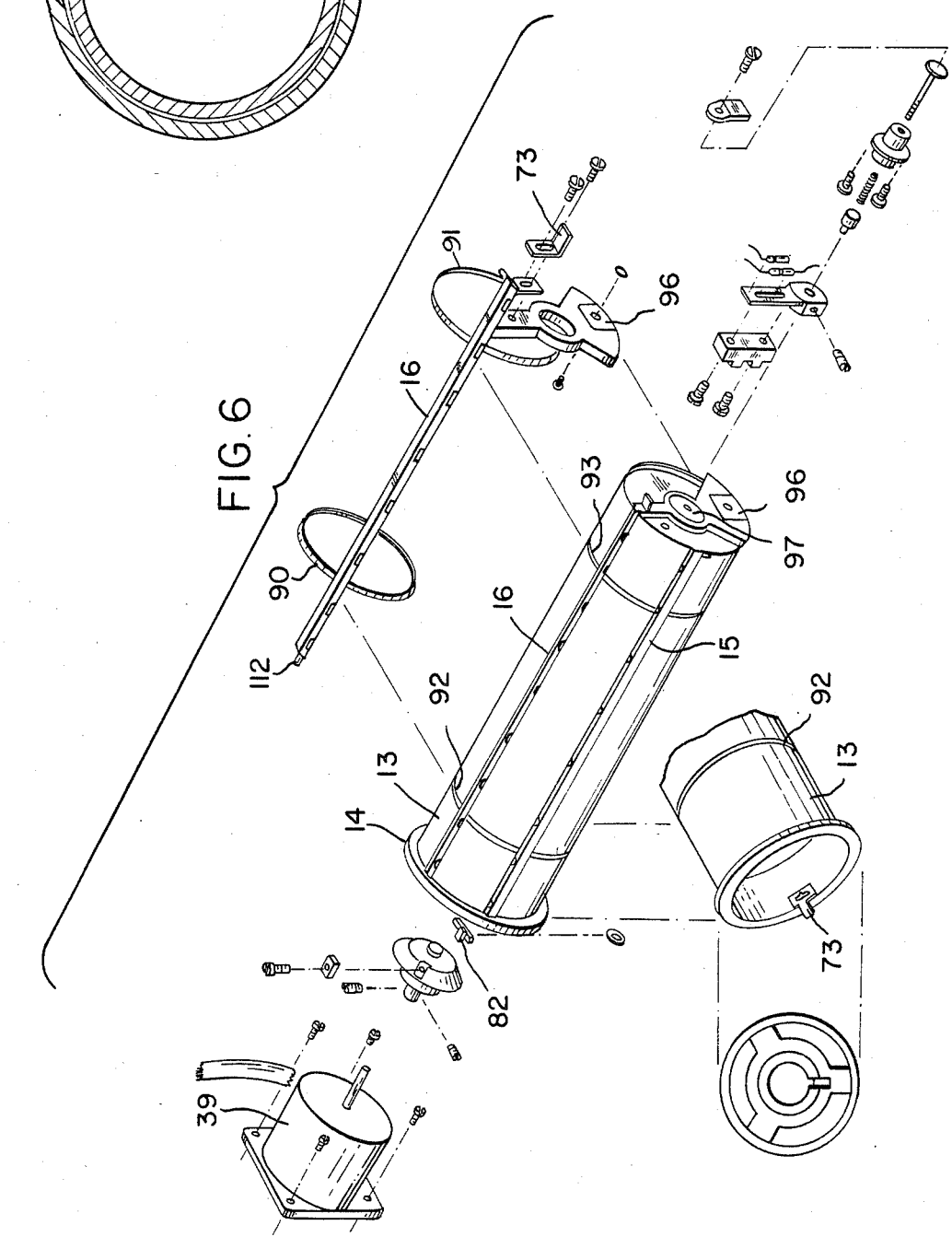

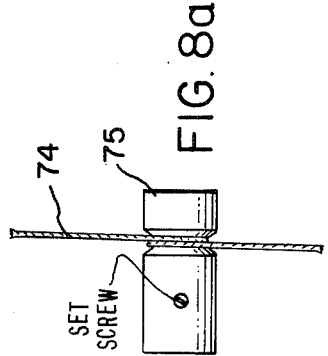
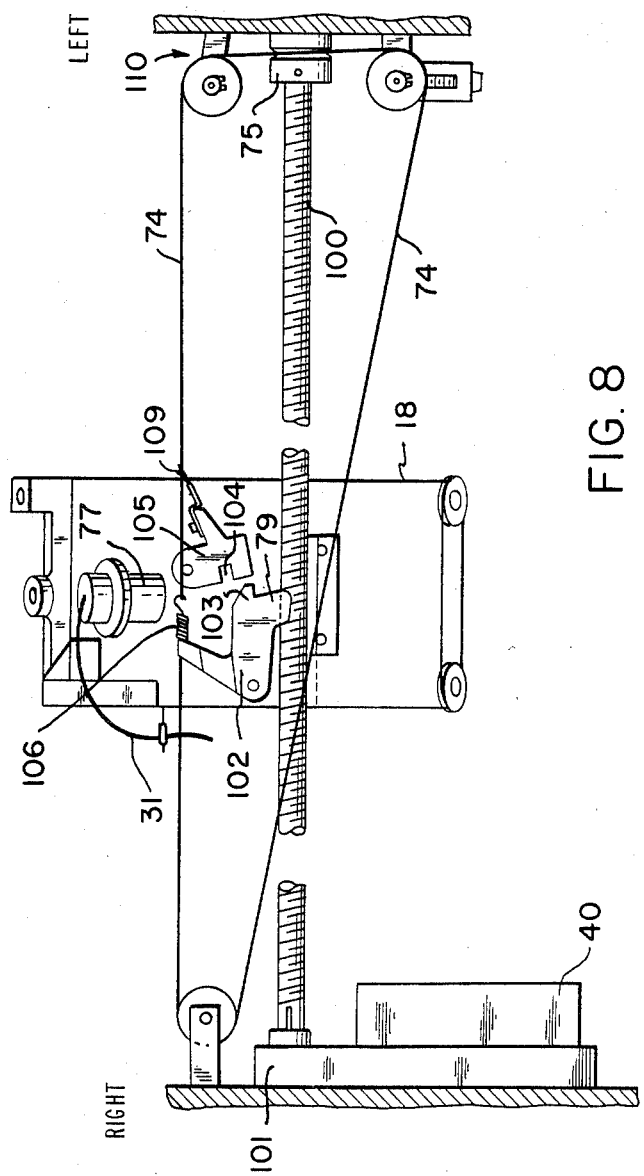
FIG. 8a
FIG. 8

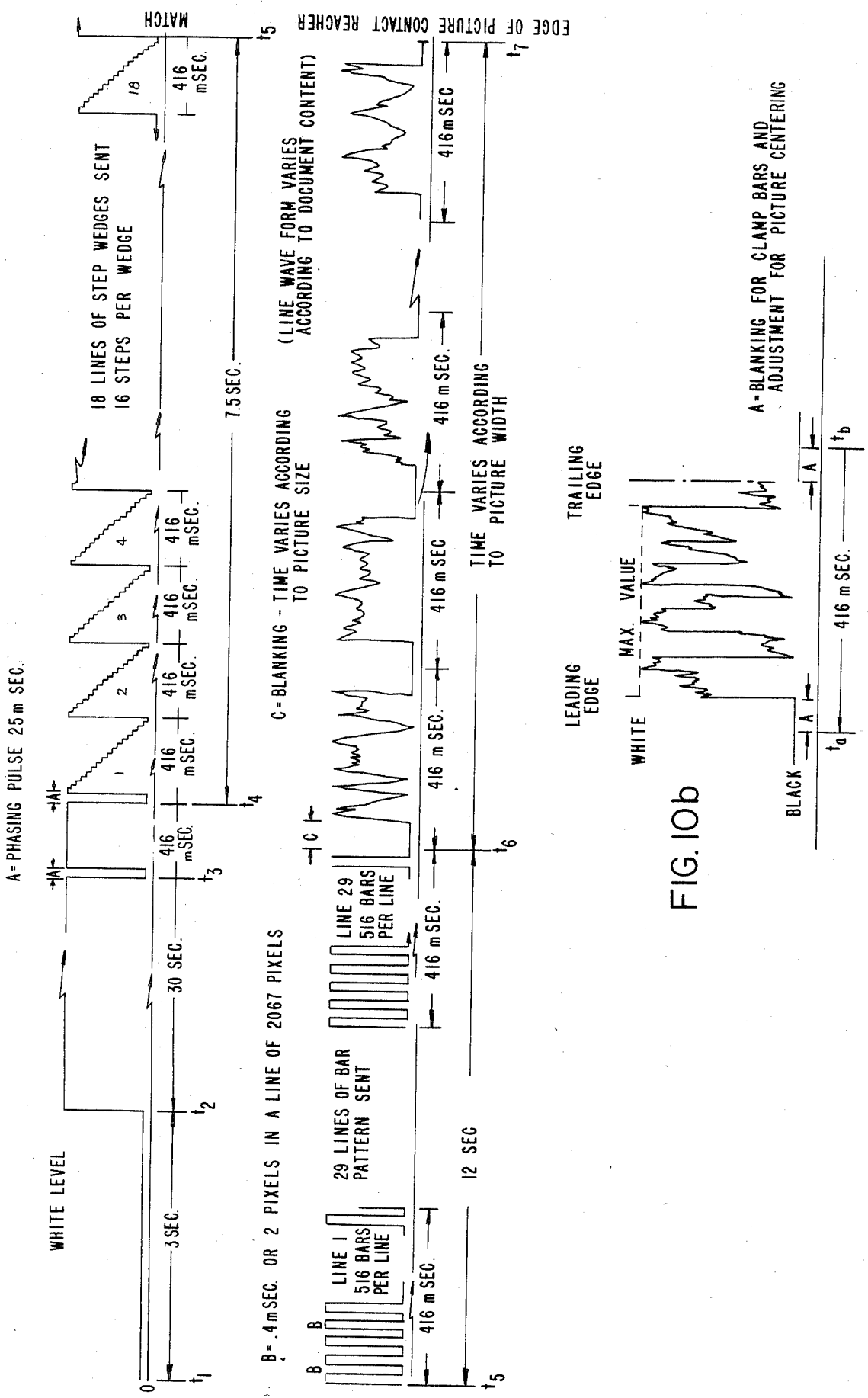

PORTABLE FACSIMILE TRANSMITTER

BACKGROUND OF THE INVENTION

This invention relates to a facsimile transmitter (preferably but not necessarily portable) capable of transmitting pictures to a remote receiver by means of a telephone wire or wireless transmission line.

Prior art transmitters of this type commonly employ a rotating drum to which the original picture to be transmitted is affixed by means of detachable clamps, and an optical system for scanning along a line parallel to the drum axis and coupling the resulting video output to a (wire or wireless) telephone transmission line.

In such prior art systems, in order to affix pictures of varying sizes to the drum, it is necessary to detach the clamps, place the picture on the drum, and reinstall the clamps. This procedure is a cumbersome one, and the clamps are readily misplaced or lost.

These prior art systems, moreover, exhibit limited quality of picture transmission. Further, malfunctions which occur during transmission result in the wasting of expensive telephone time, since the prior art units normally continue to transmit faulty picture information under such circumstances.

An additional disadvantage of prior art facsimile systems is that such systems begin the transmission at a fixed longitudinal line on the drum, so that regardless of the size of the original, the copy made at the remote receiver is disposed adjacent the leading edge of the sheet on which the copy appears, resulting at times in a reduction of copy quality.

Accordingly, an object of the present invention is to provide an improved facsimile transmitter which overcomes the foregoing and other disadvantages of prior art units of this type.

SUMMARY OF THE INVENTION

As herein described there is provided a facsimile transmitter for sending a signal comprising video information to a remote receiver via a transmission means, for reproduction on a record medium, said transmitter comprising: a rotatable cylindrical drum; drum drive means for rotating said drum at a predetermined speed; means for affixing a sheet (which may have any size within a predetermined range) to the cylindrical surface of said drum, said sheet having optically readable information to be transmitted disposed thereon; an optical carriage disposed adjacent said drum for movement along a line parallel to the longitudinal axis thereof, said optical carriage including optical means for scanning the surface of said drum and said sheet affixed thereto; carriage drive means for causing said optical carriage to translate along said line at a desired linear speed; a photodetector coupled to said optical means for converting the information on said sheet to a video signal, the video signal output range of said photodetector being determined by the amplitude of a video range bias signal applied thereto; means for causing said carriage drive means to scan along said line; and means for coupling said video signal to said transmission means.

IN THE DRAWING

FIG. 5a is an isometric drawing of the drum assembly and optical carriage of said facsimile transmitter;

FIG. 5b is an isometric drawing showing the right end of said drum assembly;

FIG. 6 is an exploded isometric drawing of the drum assembly of said facsimile transmitter;

FIG. 7 is a cross-sectional view showing the relationship between one of the rings to which the movable clamp of the drum assembly is secured, and the drum;

FIG. 8 is a partial cross-sectional rear elevation view showing the drive arrangement for the optical carriage of said facsimile transmitter, and FIG. 8a is an enlarged view of a portion thereof;

FIG. 10a shows the (unmodulated) video waveform transmitted during a complete scan of a document by said transmitter; and FIG. 10b shows the (unmodulated) video waveform transmitted during a single scan line, i.e. a single circumferential scan of the document mounted on the surface of the rotating drum of the transmitter.

SYSTEM DESCRIPTION

Figure 1:
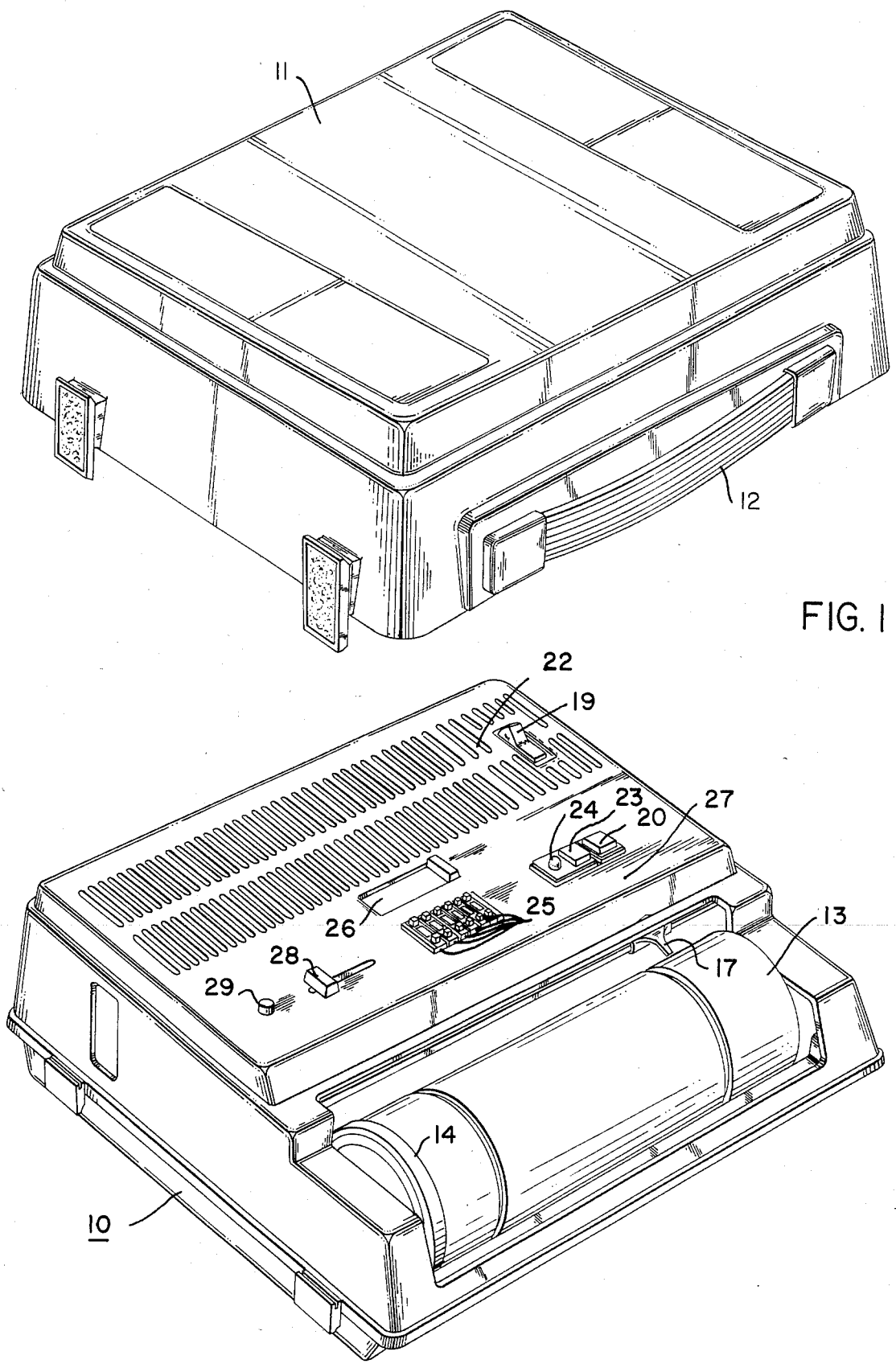
FIG. 1 is a perspective view of a portable facsimile transmitter according to a preferred embodiment of the present invention.

The portable facsimile transmitter herein described and illustrated in the drawing is a relatively light weight (under 16 lbs.) device intended to be used by reporters and photographers in the field, for transmitting high quality photographs, documents or other optically readable information to a remote receiver by way of suitable transmission means, generally a hard wire or wireless telephone system.

The sheet containing the information to be transmitted is wrapped around a cylindrical drum. The drum has a fixed clamp on its cylindrical surface, which clamp extends longitudinally on the drum and is counterbalanced. The drum also has a movable clamp which extends longitudinally thereof and which is mounted for rotation about the drum longitudinal axis and is counterbalanced.

The sheet containing the information to be transmitted is wrapped around the drum surface and secured at its leading and trailing ends by the fixed and movable clamps respectively.

The transmitter is connected to a telephone system by a modem or other suitable interface device, and a transmit button is pressed to cause the drum to start rotating at one of three pre-selected speeds (depending upon the desired resolution and/or transmission mode) and to begin the transmission sequence.

One end of an optical fiber cable is secuured to an optical carriage which is mounted for bi-directional linear movement along a line adjacent to the drum surface and parallel to its longitudinal axis. The other end of the optical fiber cable is disposed adjacent the photocathode of a stationary photomultiplier tube which serves as the photodetector. A manually movable filter is interposed between the photocathode and the adjacent end of the optical fiber cable, to permit transmission of color separations of a color photograph.

The optical carriage is mounted for relatively rapid movement in one (right to left) direction by means of a drive cable; and for relatively slow movement in the opposite (left to right) direction by means of a lead screw which engages a travelling half nut on the optical carriage. The relatively high speed movement is employed for an initial scan to set the voltages applied to the anode and dynodes of the photomultiplier tube at levels such that the peak current of the tube has a predetermined value corresponding to the brightest point on the particular sheet to be transmitted. This initial bias adjustment insures optimum utilization of the available video dynamic range; and provides improved performance over prior art arrangements, which suffer from impaired video performance since the maximum available dynamic range of the photosensor of the optical system is not always utilized, particularly where the picture to be transmitted is not bright. The relatively slow scan is employed for the actual video transmission.

An opaque tab extends beyond the left end of the drum in a position fixed with respect to the drum (and thus with respect to the fixed clamp thereof), and another opaque tab extends beyond the right end of the drum in alignment with the movable clamp. Each of these tabs intercepts a photooptical detector as the drum rotates, and the outputs of the detectors are employed to determine the speed of rotation of the drum and the length of the sheet being transmitted (by measuring the time interval between pulses generated at the detector outputs).

After the drum has commenced rotating eight revolutions (to allow for start-up transients), the drum speed is determined from the output of at least one of the detectors and compared to the selected speed. In the event of any deviation the transmission is automatically terminated.

In the event of mechanical malfunction or video problems, the transmission process is automatically terminated.

Once the optical carriage has undergone its fast right to left scan for the purpose of setting the "background" or photomultiplier tube bias level, the optical carriage engages the lead screw drive mechanism and commences to be driven from left to right at the relatively slow transmission scan speed, which is such that the left to right scan takes approximately eight minutes for a sheet of maximum (8.5 inches) width. The transmission is terminated when the optical carriage engages an edge of document (EOD) indicator/contact manually set adjacent the right edge of the sheet.

During the 9.6 minute (maximum) transmission the video output from the photomultiplier tube is digitized, processed by a microprocessor unit and associated peripheral chips to provide amplitude compression and whatever type of modulation is desired to facilitate transmission over the transmission means to be employed, and converted back to analog form for transmission.

The analog to digital and digital to analog conversions are performed synchronously with the other operations of the microprocessor unit, so as to minimize ripple and noise.

The microprocessor unit also provides mutually synchronous timing signals for driving (i) the stepping motor which rotates the drum, (ii) the stepping motor which rotates the lead screw which drives the optical carriage during normal transmission scan (and which indirectly drives the optical carriage during the initial relatively rapid scan), and (iii) a DC to DC converter which steps up the power supply voltage to the relatively high voltage (550 to 950 volts) employed to bias the photomultiplier tube. The mutually synchronous nature of the timing signals, especially those associated with the DC to DC converter, further serves to minimize ripple and noise.

A permanent memory setting identifies the serial number of the particular transmitter; while manually settable switches are provided to identify the place (country and city, for example) from which the transmission is being made, and the particular document being transmitted from that place. This identification data is converted to the proper form for transmission by the microprocessor, and coupled to the telephone line or other transmission means via a conventional modem.

The microprocessor utilizes the signals derived from the photooptical detectors associated with the fixed and movable tabs associated with the fixed and movable clamp, to provide centering of the transmitted video information, so that the reproduced picture at the remote receiver is centered on its record medium (each section of which record medium normally has a length equal to the circumference of the transmitter drum).

The transmitter is capable of automatically transmitting the information on the sheet placed on its drum surface, in response to a request signal from the remote receiver.

The video signal may be transmitted to either frequency modulated (FM) or amplitude modulated (AM) form. Generally, frequency modulation is preferred when the transmission means is relatively noisy (e.g. for wireless communications), whereas amplitude modulation is preferable in a low noise environment, due to its greater speed for a given bandwidth. The data respecting transmitter unit identification, place of transmission, and document number, is transmitted via the modem, in FSK (Frequency Shift Keying) format.

The transmitter optical resolution is 2,067 pixels per scan line perpendicular to the drum axis, i.e. per drum circumference. At the fastest drum rotation speed of 144.05 r.p.m., video information is generated at a rate corresponding to a transmission bandwidth of 2,841 Hz.

The chips peripheral to the microprocessor unit include two memory chips which contain fixed program information, two buffer register interface chips for enabling the microprocessor to "read" the switch which identifies the particular transmitter and the manually settable switch which identifies the place of transmission and the document number, and to provide coupling to a digital to analog converter which enables the microprocessor to vary the input to the DC to DC converter which provides the high operating voltage for the photomultiplier tube, so that the tube bias level can be controlled to correspond to the brightest part of the sheet to be transmitted, as previously described.

Another chip acts as a buffer register communication interface between the microprocessor and the modem, to facilitate the transmission of the aforementioned transmitter unit identification and place of transmission data.

DETAILED DESCRIPTION

As seen in FIG. 1, the portable facsimile transmitter 10 has a detachable cover 11 with a carrying strap 12.

The forward position of the transmitter 10 contains a rotatable cylindrical drum 13 upon which the original of the document to be transmitted is disposed. In a preferred embodiment the drum 13 has a diameter of 3.3 inches and an overall length of 9.31 inches, and is capable of accommodating a sheet having a width in the range of 2 to 8.5 inches and a length in the range of 2 to 10 inches; with optimum performance being realized for sheets having a width in the range of 4 to 8.5 inches and a length in the range of 5 to 10 inches.

The drum 13 is rotated at 60 or 120 revolutions per minute (rpm) in the two frequency modulation transmission modes, and at 60, 120 or 144 rpm in the amplitude modulation transmission modes.

The drum 13 is optically scanned with a spot size having a diameter of about 10 mils, corresponding to 2,067 pixels per circumferential scan line. At the maximum drum rotation speed of 144 rpm, the theoretical required bandwidth is 2,067 pixels per revolution × 144 revolutions per minute × 1 minute/60 seconds × 1 cycle/two pixels = 2,481 cycles per second = 2.481 KHz.

The sheet containing the photograph or other document to be transmitted is mounted on the drum 13 so that one edge of the sheet is adjacent the left edge 14 of the drum 13. The sheet is then retained in position by attaching the fixed and movable clamps 15 and 16 (FIGS. 5a & 6). Thereafter the edge of document indicator/contact 17 is moved to a position adjacent the right edge of the document to be transmitted, so that the optical carriage 18 (FIGS. 5a & 8) may later scan between the left edge 14 of the drum and the right edge of the document, so as to avoid wasting transmission time by scanning the unused right hand portion of the drum 13.

The power supply to the transmitter 10 is turned on and off by the power on-off switch 19. When it is desired to talk to a person or recorder at the remote receiver, this is done by pressing down the momentary push-to-talk button 20 and speaking into the microphone 21 (FIGS. 2 & 3), which is situated beneath the grill area 22 of the transmitter 10. The push-to-talk button 20 is depressed only when video information respecting the document or sheet on the drum 13 is not being transmitted.

To start (or to terminate) the transmission of video information, the transmit switch 23 is depressed. The transmit light 24 is illuminated during the time that video transmission is taking place, commencing when the initial scan starts (prior to actual video transmission).

The five picture identification sub-miniature, bidirectional pushbutton code switches 25 are manually set to identify the place of transmission and the particular picture being transmitted. The three leftmost ones of the code switches 25 contain alphabetic characters, while the two right hand code switches thereof contain numbers. Pictures are identified by three letters defining the city or other area in which the transmitter is situated, followed by two numbers identifying the particular picture being transmitted from that location. The resulting picture identification code is transmitted with the video information respecting the picture itself, i.e. as a separate code at the beginning of the transmission.

Beneath the slidable cover 26 are situated three mode selection switches 26 (FIG. 3), two of which control the drum rotation speed and the third of which selects amplitude modulation or frequency modulation for transmission of the video signal.

During audio communication sound is received via a speaker 44 (FIGS. 2 & 3) located beneath the region 27 of the transmitter 10, with the speaker volume controlled by the slide resistor 28.

Figure 3:
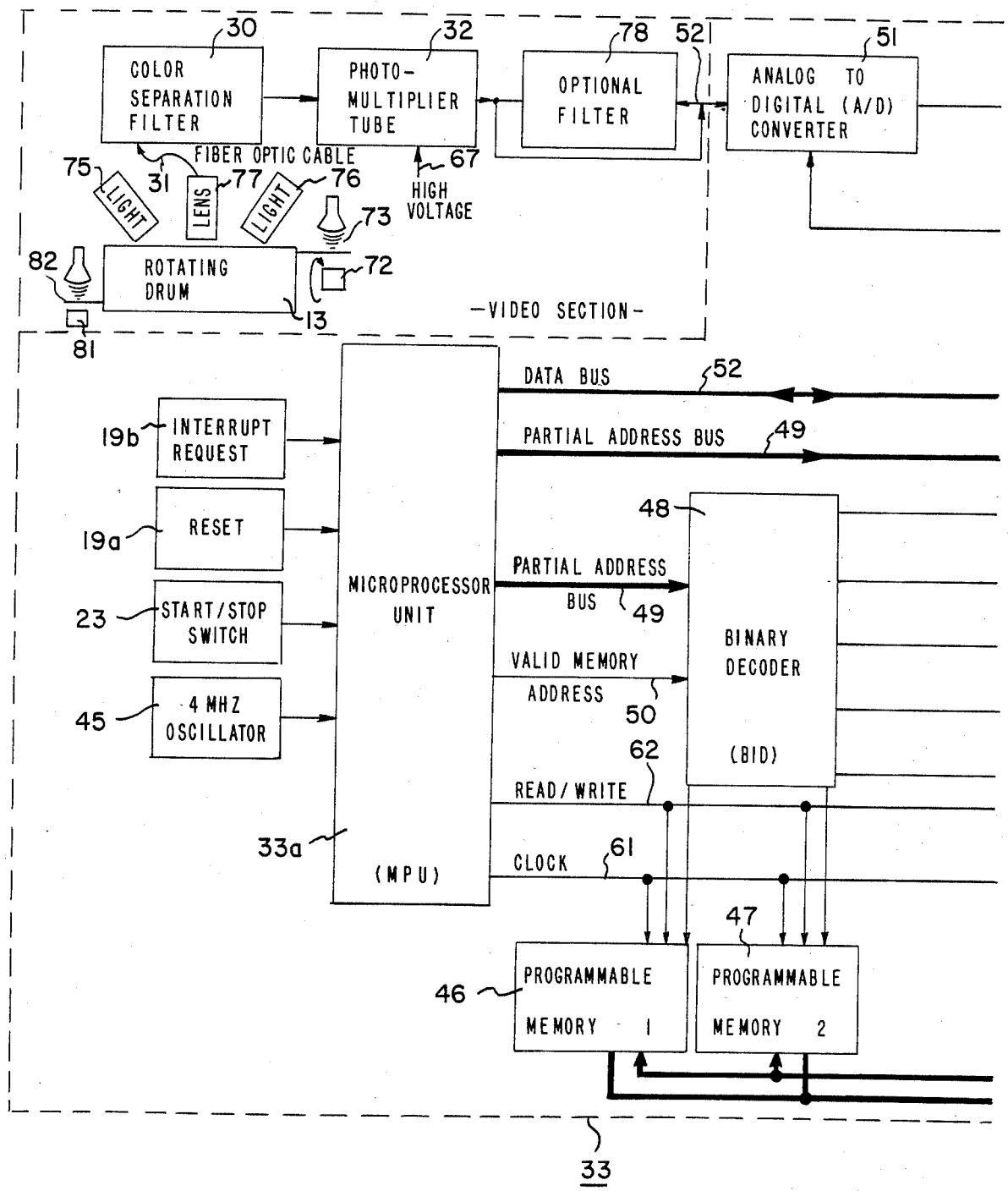
FIG. 3 (three sheets) is a more detailed block diagram of said facsimile transmitter.
Figure 3:
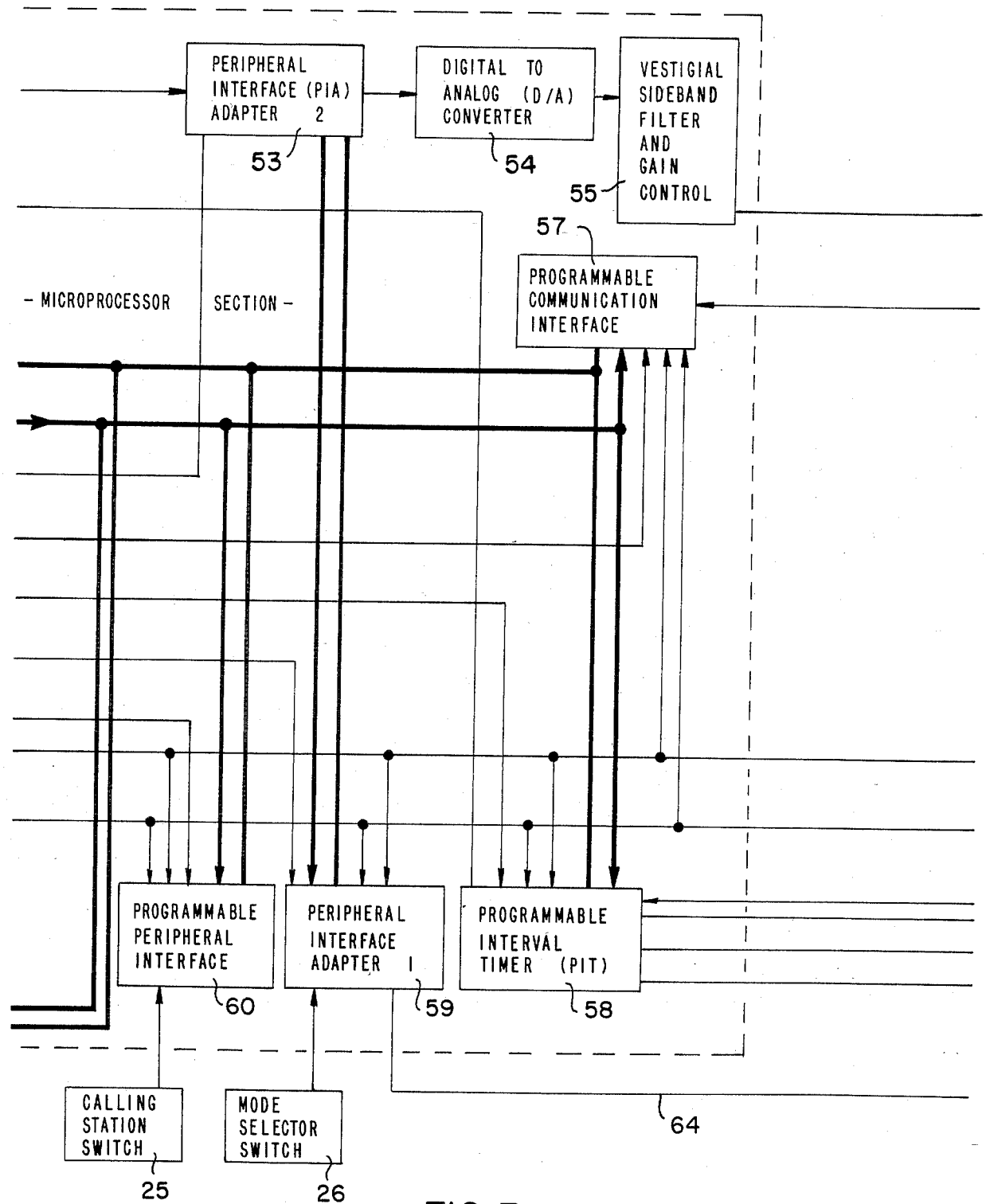
Figure 3:
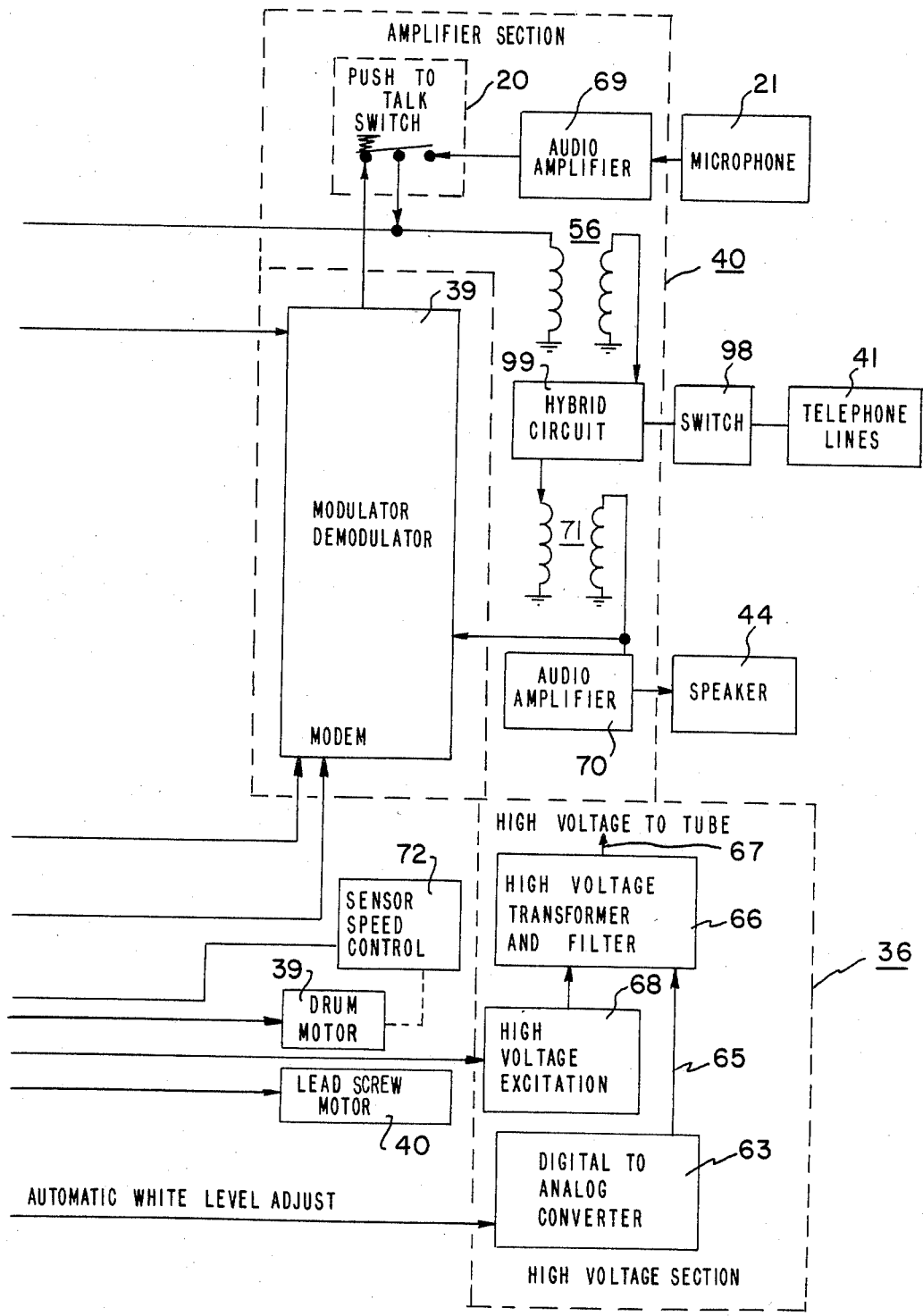

The vertically movable knob 29 controls the position of a color separation filter 30 (FIGS. 3 & 5a) interposed between the fiber optic cable 31 (FIGS. 3 & 5a) and the photomultiplier tube 32 (FIG. 3).

Figure 2:
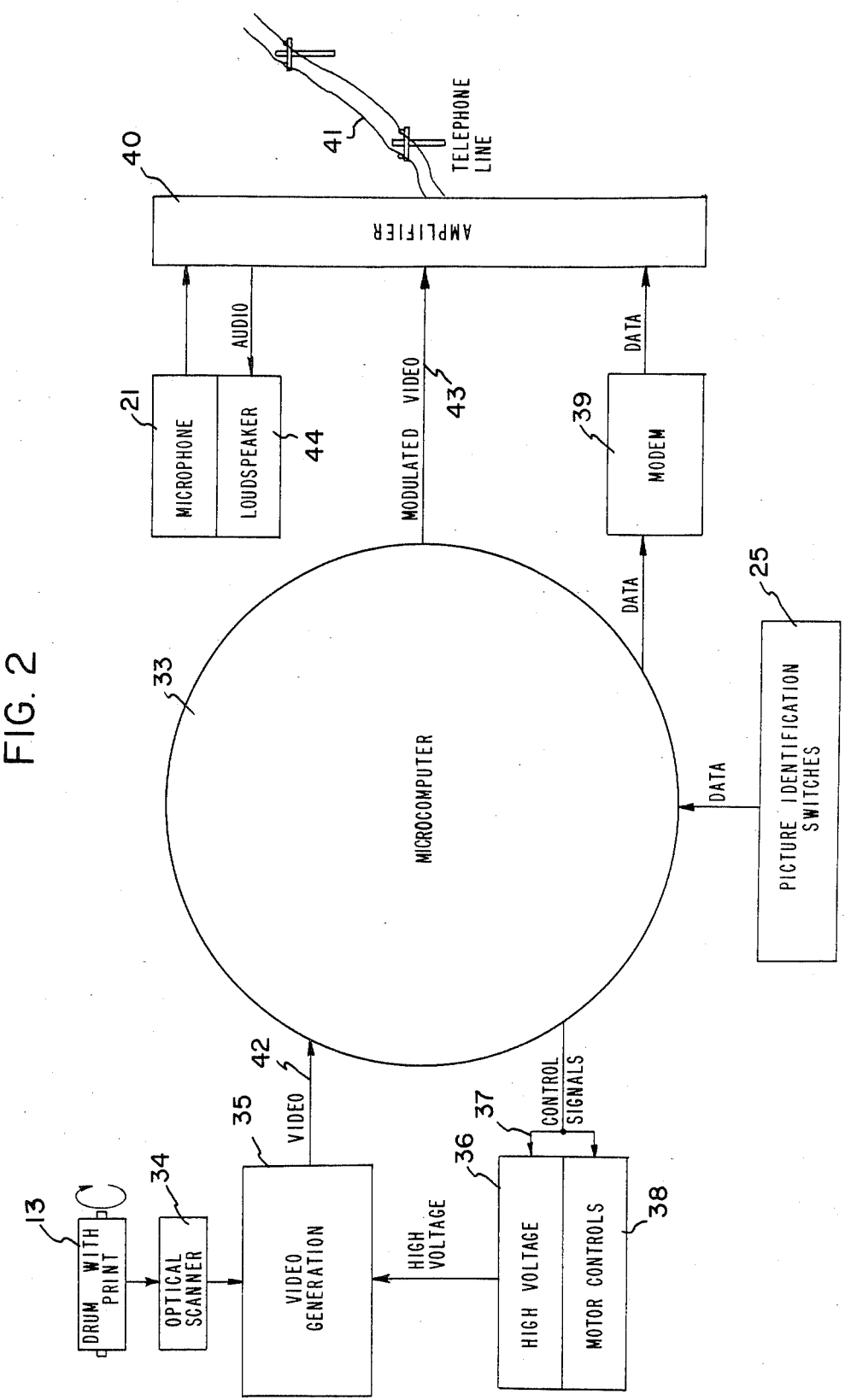
FIG. 2 is a simplified block diagram of said facsimile transmitter.

The general organization of the circuitry of the transmitter unit 10 is shown in FIG. 2, from which it is apparent that the microcomputer 33 monitors and controls the various mechanical and electromechanical parts of the transmitter unit 10 as well as the flow of information therein.

The optical scanner 34 comprises the optical carriage 18, fiber optic cable 31, and color separation filter 30, and serves to optically communicate the scanned area of the sheet on the drum 13 to the video generation circuit 35, which comprises the photomultiplier tube 32 and its associated circuitry.

The high voltage for biasing the anode and dynodes of the photomultiplier tube 32 is provided by a high voltage control circuit 36 which includes a digital to analog converter for generating a variable level DC control signal in response to an input signal from the microcomputer 33 on line 37, as well as a DC to DC converter for stepping up the variable level DC control signal to the high voltage required for operation of the photomultiplier tube 32.

The microcomputer 33 also provides digital signals to the motor control circuits 38, which drive the drum rotation stepping motor 39 (FIGS. 3 & 5a) and lead screw rotation stepping motor 40 (FIGS. 3 & 8).

Data preset by the picture identification switches 25 is encoded by the microcomputer 33 and coupled to the modem 39 for transmission via the amplifier 40 to the telephone transmission line 41. Similarly, the video output of the video generation circuitry 35 on line 42 is amplitude compressed and modulated by the microcomputer 33, and delivered to the telephone line 41 through amplifier 40 via line 43. The amplifier 40 also serves to provide amplification and hybrid functions for coupling the microphone 21 and loudspeaker 44 to the telephone line 41.

The structure of the hollow drum 13 and its associated components is best shown in FIGS. 6 and 7, from which it is seen that the fixed clamp 15 extends longitudinally across the drum surface in a predetermined position with respect to (but not necessarily in alignment with) the fixed tab or flag 82, which is secured to the left end of the drum 13. The surface of the drum 13 and the associated components are preferably painted flat black to minimize undesirable optical effects.

The fixed tab 82 is secured to the left end of the drum 13 (as seen looking at the front of the transmitter unit 10) near the fixed clamp 15, and the position of the tab 82 is adjusted so that the blanking pulse in the video transmission (see FIGS. 10a and 10b) commences as the fixed clamp 15 is scanned by the lens 77 of the optical carriages 18.

The drum 13 is preferably rotated about an axis which is slightly off its geometric center, in a radial direction toward the fixed clamp 15, so that the weight of the fixed clamp is effectively counterbalanced by the resulting weight distribution of the drum itself.

The movable clamp 16 is affixed, by brazing or welding, to two spaced rings 90 and 91, which are made of spring metal and are rotatably disposed in correspondingly spaced circumferential grooves 92 and 93 in the surface of the drum 13.

The rings 90 and 91 each have overlapping ends with holes therein, and there is a corresponding access hole in the bottom of each of the grooves 92 and 93. The rings 90 and 91 (with the movable clamp 16 affixed thereto) are assembled to the drum 13 by slightly enlarging the (open) rings and sliding them onto the drum 13 until they spring into the grooves 92 and 93. The rings are then rotated to align the holes in their ends with the access hole 94 in the bottom of each groove, and the ends of each ring are secured with a flat head countersunk rivet 95, so that the rings 90 and 91 and movable clamp 16 affixed thereto can freely rotate about the longitudinal axis of the drum 13 while remaining at all times parallel to said axis.

The movable clamp 16 has an extension 112 (FIG. 5a) which rides in an undercut groove in the left edge lip 14 of the drum 13, level with the drum surface, to provide additional stability for rotation of said movable clamp.

In order to balance the weight of the movable clamp 16, a counterweight member 96 is provided. The counterweight 96 is affixed to one end of the movable clamp 16 and journalled for rotation about the boss 97 disposed at the corresponding end of the drum 13.

A position indicating tab or flag 73 is secured to the same end of the movable clamp 16 as the counterweight 96, i.e. the end opposite that to which the fixed tab 82 is affixed.

The structure of the transmitter unit 10 is shown in more detail in FIG. 3, with respect to which the operation of said transmitter unit is hereafter described.

After the drum 13 has been properly loaded with a document to be transmitted and the edge of document indicator/contact 17 (FIG. 1) has been set slightly to the right of the right hand edge of the document (as seen looking at the front of the transmitter unit), the transmitter unit 10 is turned on by pressing the power on switch 19. A contact 19a on the switch 19 resets the various temporary storage circuits and registers of the microprocessor unit 33a, which comprises an integrated circuit chip manufactured by Motorola, Inc. as its microprocessor Model No. 6802. This chip comprises an 8 bit microprocessor, including an on-chip clock circuit which is synchronized with the 4 MHz. oscillator 45.

The microcomputer 33 includes memory chips 46 and 47, which store the program for the microprocessor unit 33a. The assembly language program contained in the memories 46 and 47 is the subject of a certificate of copyright registration No. TXU 60-379, registered as an unpublished work on Jan. 23, 1981.

Also included in the microprocessor 33 is a binary decoder 48 which responds to address codes on the partial address bus 49 and the valid memory address line 50, to selectively enable various sections of the microcomputer 33 as specified by the address signals on lines 49 and 50.

The analog to digital converter 51 converts the video signal from the photomultiplier tube 32 on line 52 to 8 bit serial form, for communication to the microprocessor unit 33a on the data bus 52 via the peripheral interface adapter 53, which acts as a buffer register for this purpose. The peripheral interface adapter 53 contains another buffer register which acts to receive processed (amplitude compressed and modulated) video signals from the microprocessor unit 33a on data bus 52, and to communicate said signals to the digital to analog converter 54, which changes the video signals to the desired analog form for transmission.

The output of digital to analog converter 54 passes through a vestigial sideband filter and gain control circuit 55, for adjusting the bandwidth and amplitude of the video signal to be compatible with the telephone lines 41, the output of the circuit 55 being coupled to the telephone lines 41 via an impedance matching transformer 56 disposed within the amplifier section 40, a hybrid circuit 99, and a line seizing switch 98. The line seizing switch 98 is operated by the microprocessor 33a to connect the transmitter unit 10 to the telephone lines 41 when the power to the unit is turned on by means of the power on/off switch 19; and to disconnect the transmitter unit 10 from the telephone lines (thus terminating the transmission and the associated telephone line use charges) when the power to the unit is shut off or a malfunction is detected as hereafter described.

The partial address bus 49 extends not only between the microprocessor unit 33a and the binary decoder 48, but also between the microprocessor 33a and the memory chips 46 and 47, the peripheral interface adapter 53, the programmable communication interface 57, the programmable interval timer 58, the peripheral interface adapter 59, and the programmable peripheral interface 60, to permit the microprocessor unit 33a to coordinate the flow of data and information by addressing each element at the time it is to deliver data to, or receive data from the microprocessor 33a.

Each of the aforementioned parts of the microcomputer 33 connected to the partial address bus 49 communicates with the data bus 52 when addressed, said communications being synchronized and controlled by means of the clock signal on line 61 and the read/write signal on line 62.

Data respecting the transmitter location and identifying the particular transmitter unit involved is coupled to the microprocessor unit 33a on the data bus 52 from the picture identification switches 25 via the programmable peripheral interface 60, which acts as a buffer register. After being modulated by the microprocessor 33a in the manner determined by the mode selector switches 26, the picture location and identification data from the switches 25 is communicated from the microprocessor unit 33a to the programmable communication interface 57 via the data bus 52. The programmable communication interface 57 acts as a buffer register to transfer the picture identification data to the telephone lines 41 via the modem 39, push-to-talk switch 20, and transformer 56.

The mode control signals from the mode selector switches 26 are communicated to the microprocessor 33a on the data bus 52 via the peripheral interface adapter 59, which acts as a buffer register.

The peripheral interface adapter 59 also provides another buffer register for receiving a white level adjust signal from the microprocessor 33a on data bus 52, and communicating said white level adjust signal to the digital to analog converter 63 via line 64. The corresponding variable DC voltage on digital to analog converter output line 65 is coupled to the high voltage transformer and filter circuit 66, which contains a DC to DC converter for converting the variable DC voltage level on line 65 to a corresponding variable DC high voltage level on line 67, for biasing the photomultiplier tube 32.

The transformer switching control signals for the high voltage transformer and filter 66 are provided by a high voltage excitation circuit 68 in response to timing pulses from the programmable interval timer 58, which acts as a buffer register to receive and communicate said timing signals from the microprocessor unit 33a to the high voltage excitation circuit 68 via data bus 52.

The programmable interval timer 58 acts in a similar manner to provide properly timed pulses for stepping the drum rotation motor 39 at the desired speed; and for providing other timing pulses for stepping the lead screw rotation motor 40 at its proper speed.

Two-way telephonic communication is provided by the microphone 21 and speaker 44, which communicate with the telephone lines 41 via audio amplifiers 69 and 70 and transformers 56 and 71 respectively, through hybrid circuit 99 and switch 98.

The modem 39 receives control signals from the remote receiver via telephone lines 41 and transformer 71 through hybrid circuit 99, and communicates said control signals to the microprocessor unit 33a via programmable communication interface 57 and data bus 52.

When the power switch 19 is turned on, the reset signal from switch portion 19a thereof causes the microprocessor unit 33a to generate pulses to rotate the lead screw motor 40 and lead screw 100, which is engaged with the optical carriage via half nut 79, to drive the optical carriage 18 to the extreme right of the transmitter unit, as shown in FIGS. 1 and 8, i.e. to the "Home" position of the optical carriage. When the optical carriage 18 reaches the "Home" position a limit switch 101 (FIG. 8) shuts off the drive signal to the lead screw stepping motor 40.

When the transmit button 23 is depressed, the transmit light 24 illuminates and the microprocessor unit 33a generates timing pulses to rotate the drum motor 39, to cause the drum 13 to rotate at a speed determined by the mode selector switches 26.

The speed of rotation of the drum 13 determines the repetition rate of pulses generated by the photooptical detector 72 due to interruption of the optical path by the fixed clamp tab 73, which tab is in a predetermined position with respect to the fixed clamp 15 and intercepts the optical path once per revolution. The repetition rate of the resulting pulses from the photooptical detector 72 is determined by the microprocessor unit 33a, said determination being made commencing approximately three seconds (or eight revolutions of the drum 13) from the time the transmit button 23 is depressed, to allow for initial start-up of the stepper motor 39 and the drum 13. If the repetition rate of the pulses from the detector 72 deviates from the rate corresponding to the desired rotation speed of the drum 13, the transmission sequence is terminated by the microprocessor unit 33a and the lead screw motor 40 is driven to return the optical carriage 18 to its "Home" position (if it is not already there).

When the optical carriage 18 reaches its Home position, the half nut 79 is rotated out of engagement with the lead screw 100, by a spring action of the draw cable 74 on cam member 102 of which the half nut 79 is a part, causing the pawl 103 of the cam member 102 to engage the notch 104 of the cam member 105, and thus holding the half nut 79 away from the lead screw 100 against the spring action of cam member 105.

When the transmit button 23 has been depressed and the optical carriage 18 is in its "Home" position, the lead screw motor 40 (as well as the drum drive motor 39) is caused to rotate. The lead screw motor 40 turns the lead screw 100 at a rotation speed of 20 rpm, causing the drawstring or cable 74, one turn of which is wrapped around the lead screw shaft pulley 75 as best shown in FIG. 8a, to drive the optical carriage 18 to the left at a relatively rapid rate of speed, i.e. 0.33 inches per second.

As the cable 74 pulls the optical carriage 18 to the left, the drum 13 rotates so that the sheet thereon is scanned in spiral fashion, with light provided by the sources 75 and 76 being reflected from the scanned surface through the lens 77 and fiber optical cable 31 and the color separation filter 30, to impinge upon the photocathode of the photomultiplier tube 32. The lens 77 and adjacent end of the fiber optic cable 31 are dimensioned so that the spot size instantaneously scanned is approximately 10 mils in diameter.

The current flowing through the anode of the photomultiplier tube 32 varies in proportion to the intensity of the light reflected from the scanned spot on the sheet, picture or document disposed on the surface of the drum 13, thus generating a video signal on line 107. This video signal may be filtered, if desired, by an optional filter 78, for the purpose of limiting the video bandwidth to improve the signal to noise ratio.

The video signal on line 107 is converted (at twice the modulation carrier frequency rate) in accordance with a clock signal from the microprocessor 33a via the programmable interval timer 58) to digital form by the analog to digital converter 51, and coupled to the microprocessor unit 33a via the peripheral interface adapter 53 and binary decoder 48.

The microprocessor unit 33a adds initial calibration signals, i.e. step wedges and a bar pattern, to the video waveform to permit proper adjustment of the remote receiver prior to transmission of the video signal corresponding to the document on the drum 13.

The microprocessor unit 33a also processes the pulses generated by the photooptical detectors 72 and 81 as they are intercepted by the tabs 73 and 82 respectively, once each drum revolution, to determine the times at which the fixed and movable clamps, and thus the trailing and leading edges of the sheet on the drum surface, traverse the lens 77 of the optical carriage 18. The microprocessor unit 33a determines the time between the traversals of the lens 77 by the trailing and leading edges of the sheet for each circumferential scan, and (see FIG. 10a) generates a synchronizing signal, comprising two synchronizing or phasing pulses, for the entire picture transmission. By generating synchronizing signals in this manner, the remote receiver is caused to start upon receipt of said synchronizing signals, so that the reproduced document is centered on its record medium.

The microprocessor unit 33a provides improved quality of picture transmission by digital compression of the dynamic range of the video signal according to a square root curve or a logarithmic curve, as selected by the mode switches 26. The remote receiver at the other end of the telephone lines 41 provides complementary expansion of the dynamic range of the video signal, so that the system performs a companding function.

The microprocessor unit 33a, employing digital modulation techniques known in the art, applies a suitable algorithm to amplitude modulate or frequency modulate the compressed composite digital video signal, which includes the initial calibration signals and the synchronizing signal (i.e. the phasing pulses), as well as blanking signals for eliminating spurious video when the lens 77 scans the clamps 15 and 16 and the exposed surface of the drum between them, i.e. between the trailing and leading edges of the document mounted on the drum surface.

For domestic operation within the United States with amplitude modulation, the carrier frequency is 2481 Hz., while for operation internationally with amplitude modulation the carrier frequency is 1800 Hz. For operation with frequency modulation, the carrier frequency varies from 1500 to 2300 Hz.

The processed (amplitude compressed and modulated) video signal is not delivered to the telephone lines 41, however, until the initial relatively rapid (30 seconds) scan by the optical carriage 18 is completed, and normal relatively slow video scanning commences.

During the initial scan, as the optical carriage 18 is drawn to the left by the draw cable 74, the peak amplitude of the video signal is determined by the microprocessor unit 33a and an automatic white level adjust signal, corresponding to the integrated difference between the peak video amplitude and a predetermined desired value thereof, is provided by the microprocessor unit 33a on the data bus 52, and is coupled to the input of the digital to analog converter 63 via line 64 and peripheral interface adapter 59, so that the level of high voltage applied on line 67 to bias the photomultiplier tube 32 is decreased as the peak video amplitude increases, to maintain the peak video amplitude at a preset level. The operation of the photomultiplier tube is such that when the high voltage bias is reduced fewer secondary electrons are generated and the amplitude of the video signal on line 52 (which corresponds to the photomultiplier tube anode current) decreases accordingly.

Thus, during the initial right to left scan a closed circuit loop as described above is provided to adjust the bias on the photomultipler tube so that the peak video current generated during the initial scan has a preset value.

When the optical carriage 18 reaches the left end 14 of the drum 13 (as sensed by a limit or phasing switch 108), the aforementioned circuit loop is opened, and the microprocessor unit 33a maintains the last peak video signal value (i.e. the whitest white detected during the initial scan) on line 64, so that the bias on the photomultiplier tube has been set to provide the proper operating range for the range of brightness levels on the document or picture disposed on the drum 13.

At the same time, i.e. when the optical carriage 18 reaches the left end of the drum 13 after the initial scan, the projection 109 of the cam member 105 rides up on the fixed abutment 110, causing the cam member 105 to rotate (counterclockwise as seen in FIG. 8) so that pawl 103 is released from notch 104, and cam member 102 rotates (clockwise as seen in FIG. 8) under the influence of spring 106, to cause the half nut 79 to engage the rotating lead screw 100.

The lead screw 100 then commences to drive the optical carriage 18 from left to right, to scan the picture or document on the drum 13 at a rate (for domestic operation) of approximately 0.82 inch per minute (along the drum longitudinal axis). During this transmission sequence the processed video signal is provided to the peripheral interface adapter 53 from the microprocessor unit 33a on data bus 52, and from the peripheral interface adapter 53 through the digital to analog converter 54 and vestigial sideband filter and gain control circuit 55, to the telephone lines 41 via the matching transformer 56 and hybrid circuit 99.

During this transmission sequence the microprocessor unit 33a continuously monitors the time of transmission of the video signal. If the optical carriage 18 does not contact the edge of document indicator/contact 17 within a preset time (e.g. 12 minutes), the microprocessor unit 33a terminates the transmission; and a new transmission sequence may be initiated by the operator, upon again pressing the transmit button 23.

The microprocessor unit 33a is provided with pulses from a photooptical detector 81, the light impinging upon which is intercepted by the tab 73 extending from the right end of the movable clamp 16. Thus the time interval between successive pulses generated by the photooptical sensors 81 and 72 is a measure of the circumferential length of the unused portion of the surface of the drum 13, i.e. of the required video blanking interval, and is inversely related to the length of the document or picture being transmitted.

During the transmission sequence the undesired video information read from the unused portion of the drum between the trailing and leading edges of the sheet thereon, i.e. between the movable clamp 16 and the fixed clamp 15 as determined by the photooptical detectors 72 and 81 (with suitable adjustment or calibration to reflect any positional difference between the fixed clamp 15 and the fixed tab 82), is deleted and replaced with a blanking signal included in the video signal by the microprocessor unit 33a.

The microprocessor unit 33a utilizes the pulse outputs of the detectors 72 and 81 to generate the video signal on data bus 52 so that the resulting facsimile copy generated at the remote receiver at the other end of the telephone lines 41, is centered on the sheet upon which it is reproduced. That is, the transmitter 10 is used to send documents or pictures of varying length, whereas the remote receiver employs a record medium having a fixed length corresponding to the circumference of the drum 13, so that unless the video information is processed by the microprocessor unit 33a so as to be properly centered, the pictures or documents reproduced at the remote receiver will be crowded at one end of the record medium used for the reproduction thereof.

Centering of the video signal is accomplished by the microprocessor unit 33a, by determining the length of the blanking time interval corresponding to the distance between the movable and fixed clamps 16 and 15 respectively, as previously described; dividing the time interval in half, and generating, as part of the video signal, a synchronizing signal at the midpoint of the video blanking interval, to cause each circumferential scan line at the remote receiver to begin in the middle of the blanking interval, i.e. halfway between the positions of the fixed and movable clamps 15 and 16.

The unmodulated form of the composite video signal generated by the transmitter unit 10 is shown in FIGS. 10a and 10b, wherein FIG. 10a shows the waveform for a complete document scan (consisting of 1376 circumferential scan lines at 144 rpm for a document having a width of 8.0 inches), and FIG. 10b shows the waveform of a single circumferential scan line.

In FIG. 10a time $t_1$ is the time that the transmit switch 23 is depressed; and $t_2$ is the time at which the initial scan (for setting the photomultiplier tube bias level) commences and the transmission of white level begins. Before time $t_1$, the modem 39, operating in a reset mode, transmits a code which identifies the serial number of the particular transmitter unit involved, the geographic location of the unit, and the particular picture or document being transmitted. Commencing at time $t_3$, there are transmitted two synchronizing or phasing pulses of predetermined width and spacing, which signal the receiver drum to commence rotation. These phasing pulses are followed at time $t_4$ by step wedges of predetermined slope.

The step wedge waveform is transmitted for a total of 8 circumferential scan lines after which, commencing at time $t_5$, a series of fixed black and white levels is transmitted to generate a bar pattern at the remote receiver. This bar pattern waveform is transmitted for a total of 29 circumferential scan lines after which, commencing at time $t_6$, the lead screw drive motor 40 is driven to rotate the lead screw 100 to drive the optical carriage from the left end 14 of the drum 13 toward the right, to commence the video transmission scan, and successive lines of video (each preceded by a blanking pulse) are transmitted, until the image of the entire document has been transmitted, at which time transmission ceases at time $t_7$.

As seen in FIG. 10b, a video scan line commences at time $t_a$, approximately midway between the trailing and leading edges of the document mounted on the drum 13, i.e. midway between the fixed clamp 15 and movable clamp 16, as determined from the pulses generated by the photooptical detectors 72 and 81. A blanking signal is provided between the adjacent trailing and leading edges of the document to eliminate spurious signals due to reflections from the exposed surface of the drum 13 and the clamps 15 and 16. With this arrangement the video signal corresponding to the information on the document itself is centered within the corresponding scan line, so that the reproduced image of the document is centered on its record medium, regardless of the length of the original document.

In most cases, the transmitter unit 10 is connected to the telephone lines 41 by means of a suitable plug or adapter, the telephone number corresponding to the remote receiver is dialed by the operator of the transmitter unit, and voice communications take place via the microphone 21 and speaker 44, to facilitate the video transmission. At the proper time, the transmit button 23 is depressed to begin the sequence of operations previously described.

In some cases, however, it is desirable to leave the transmitter unit 10 connected to the telephone lines 41 and unattended. In such cases the remote receiver may activate the transmitter unit 10 via a conventional telephone answering circuit (not shown) to initiate the transmit sequence, by sending a predetermined transmit code through the telephone lines 41. Such a signal is coupled through the hybrid circuit 39, transformer 71, modem 39 and programmable communication interface 57 to the microprocessor unit 33a via the data bus 52. The microprocessor unit 33a, upon recognizing the encoded transmit command signal, commences to operate in precisely the same manner as if the transmit switch 23 had been depressed.

As best seen in FIG. 5a, the color separation filter 30 comprises three optical filters transmitting the colors magenta, yellow and cyan respectively, with the three filters being linearly arranged so that the control knob 29 can selectively interpose a selected one of the filters between the adjacent end of the fiber optic cable 31 and the photocathode of the photomultiplier tube 32.

The calling station switches 25 include not only manually settable switches giving picture identification information as previously discussed, but also a preset switch or switches identifying the serial number or other designation of the particular transmitter unit 10 involved.

The peripheral interface adapters 53 and 59 may each comprise a microprocessor chip of the same type as the microprocessor unit 33a. The programmable interval timer 58 may comprise an integrated circuit chip sold by Intel, Inc. as Model No. 8253. The programmable peripheral interface 60 may comprise an integrated circuit chip sold by Intel, Inc. as Model No. 8255.

Figure 4:
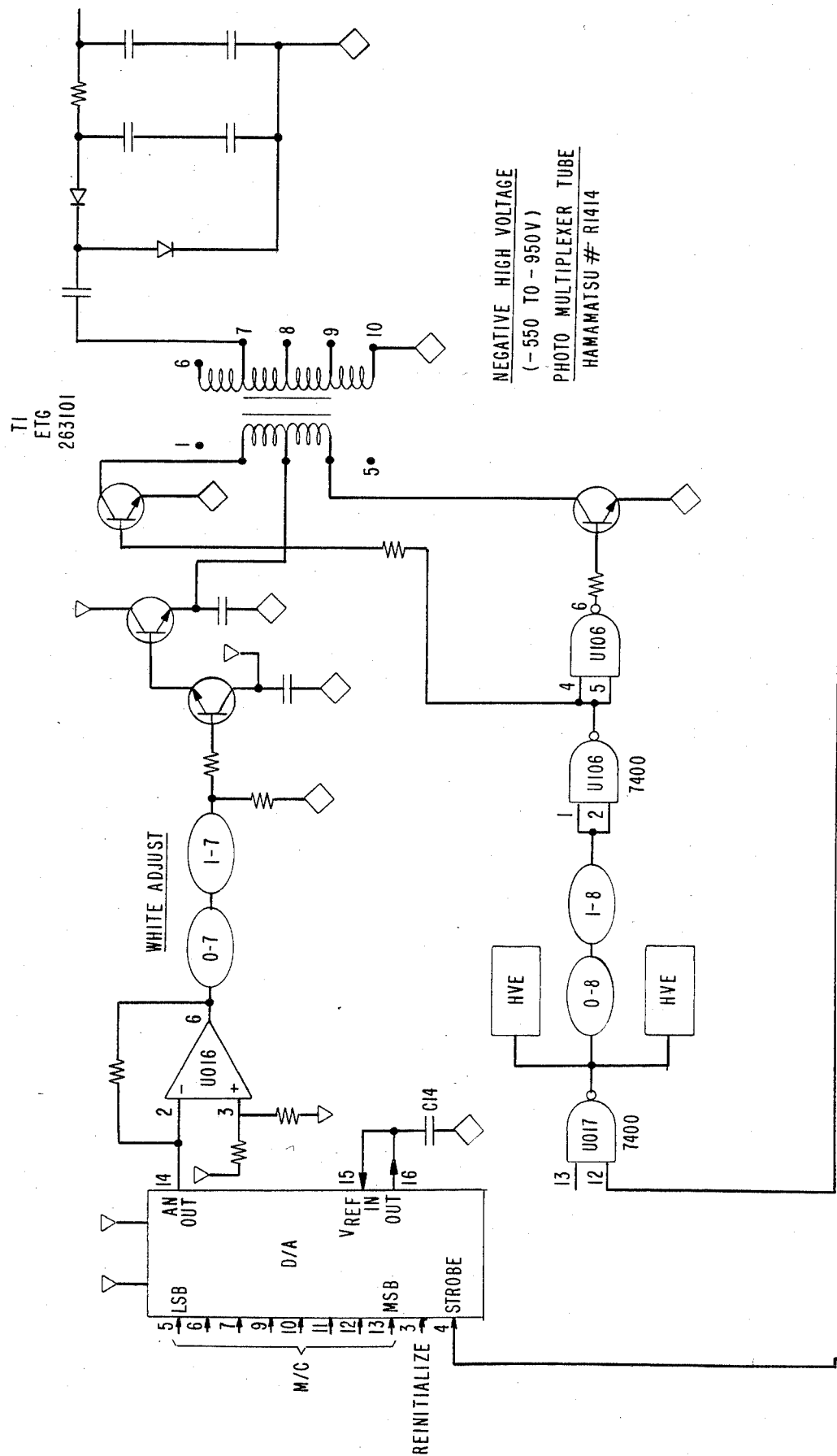
FIG. 4 (four sheets) is a functional schematic/block diagram of said facsimile transmitter.
Figure 4:
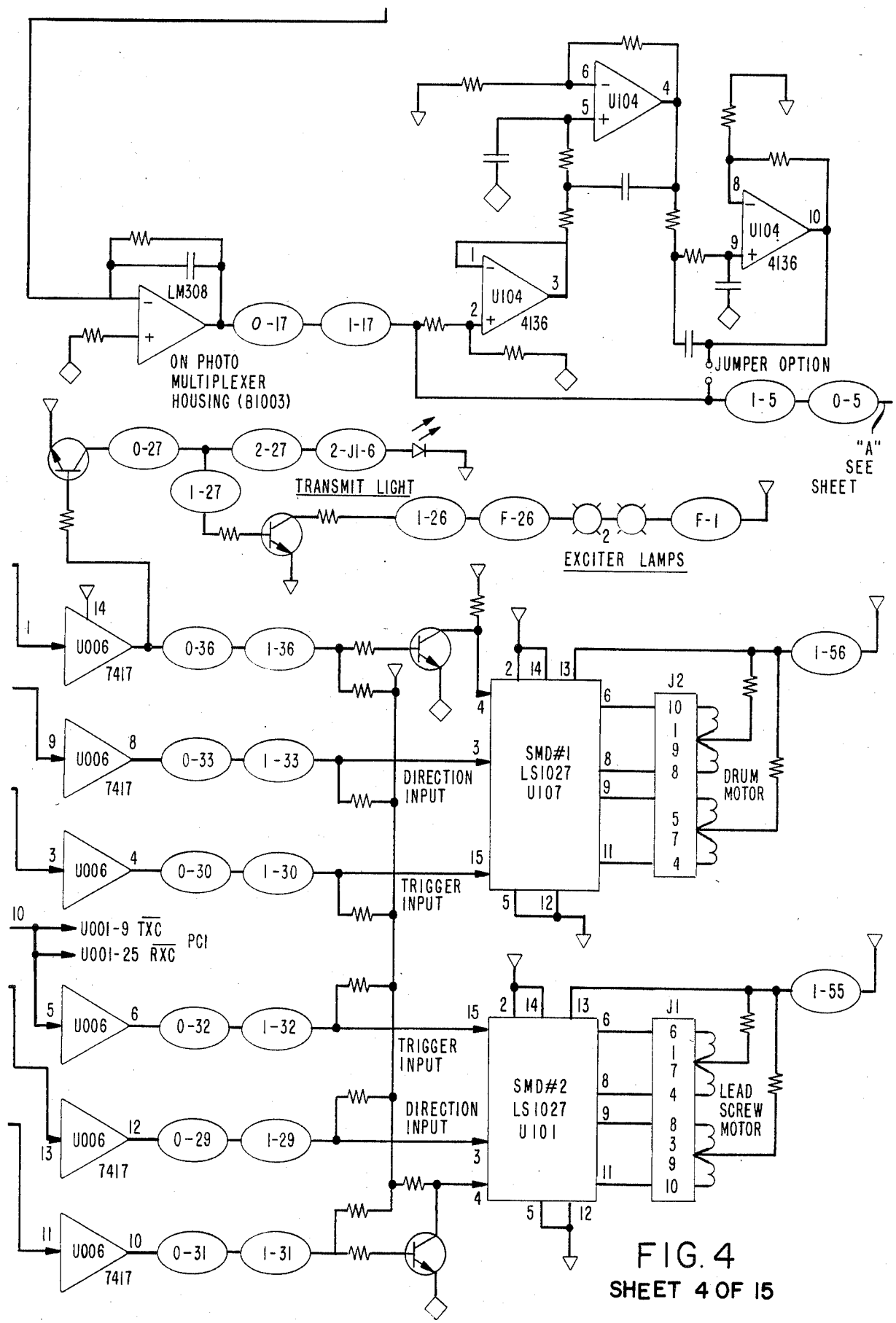
Figure 4:
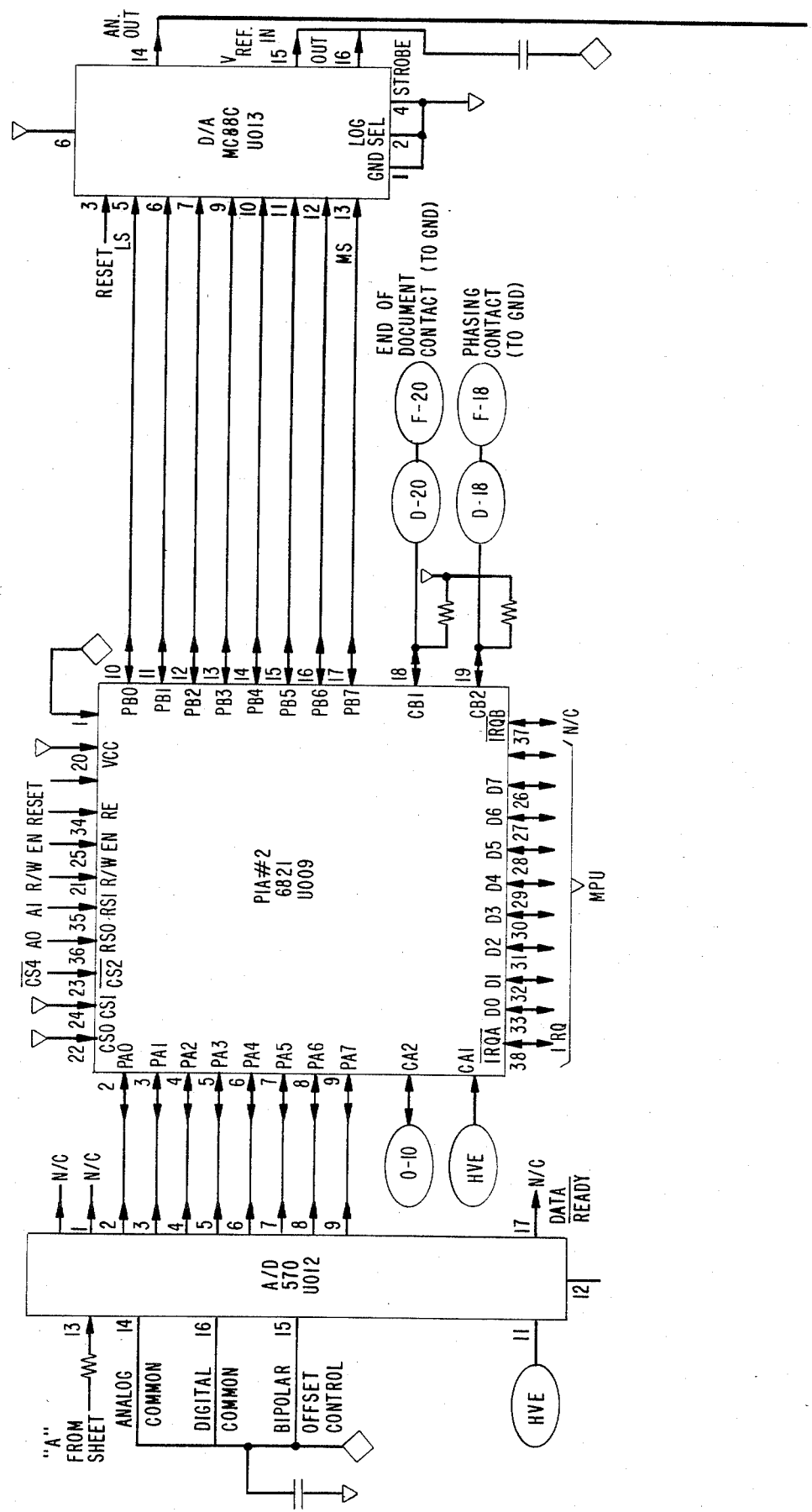
Figure 4:
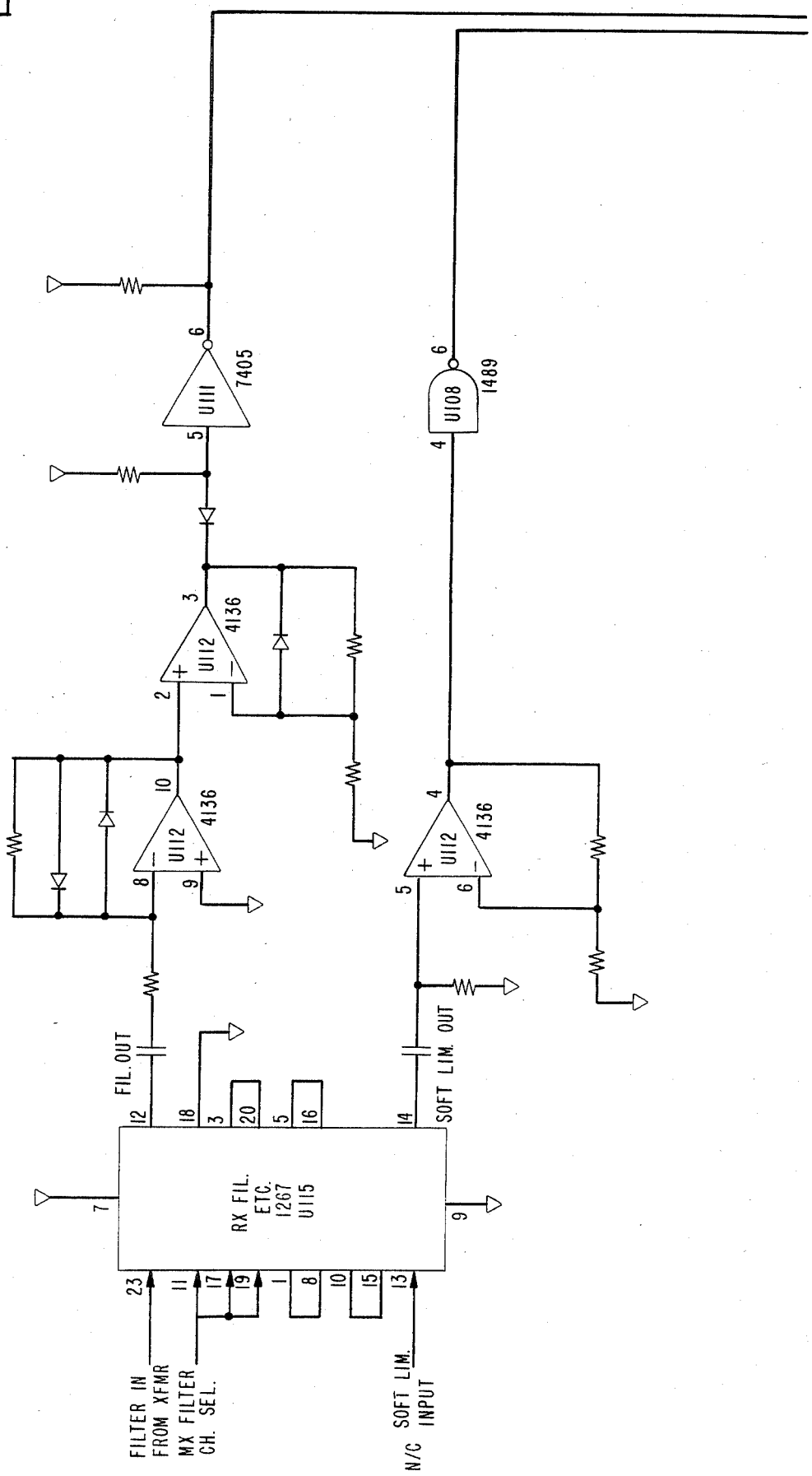
Figure 4:
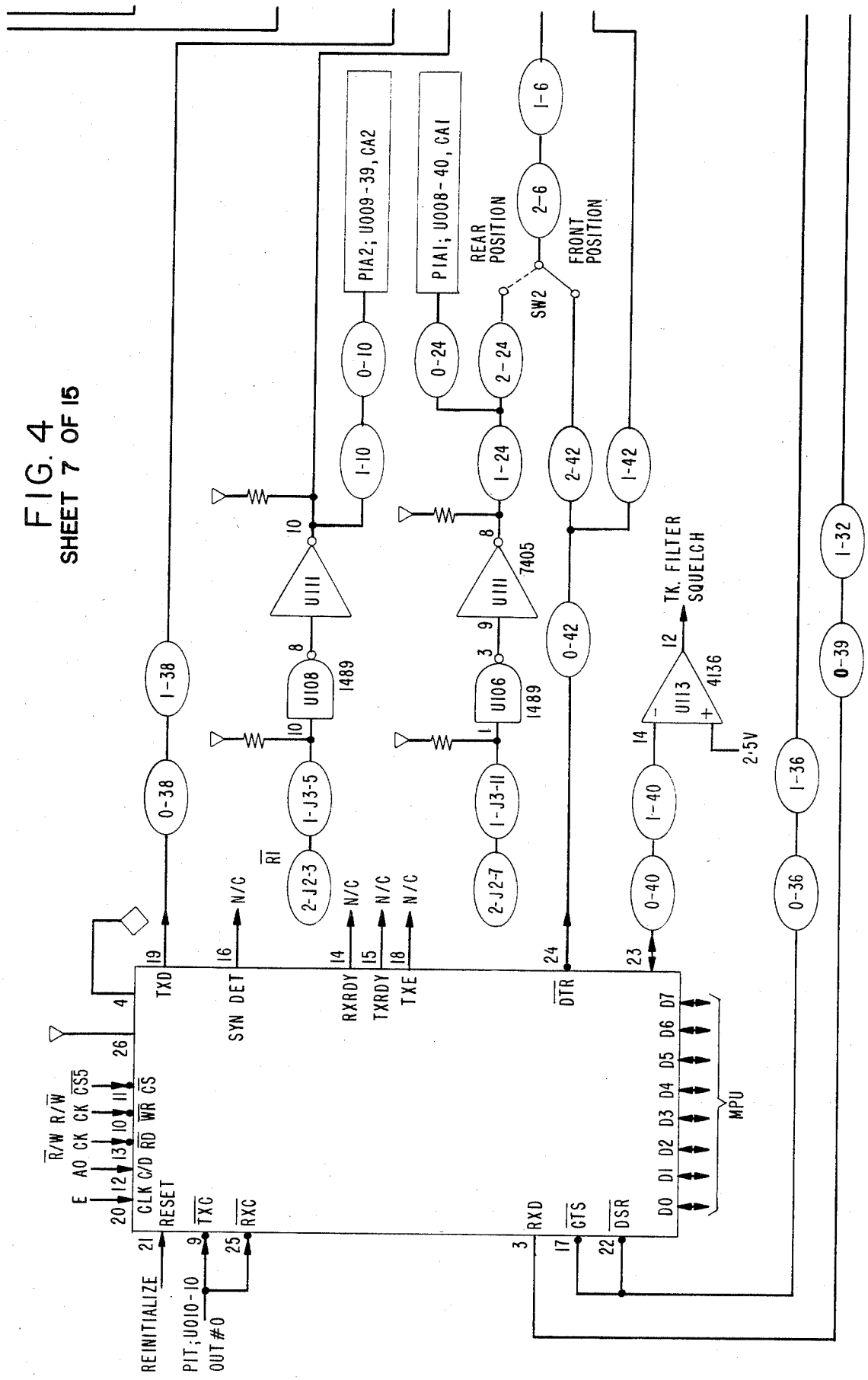
Figure 4:
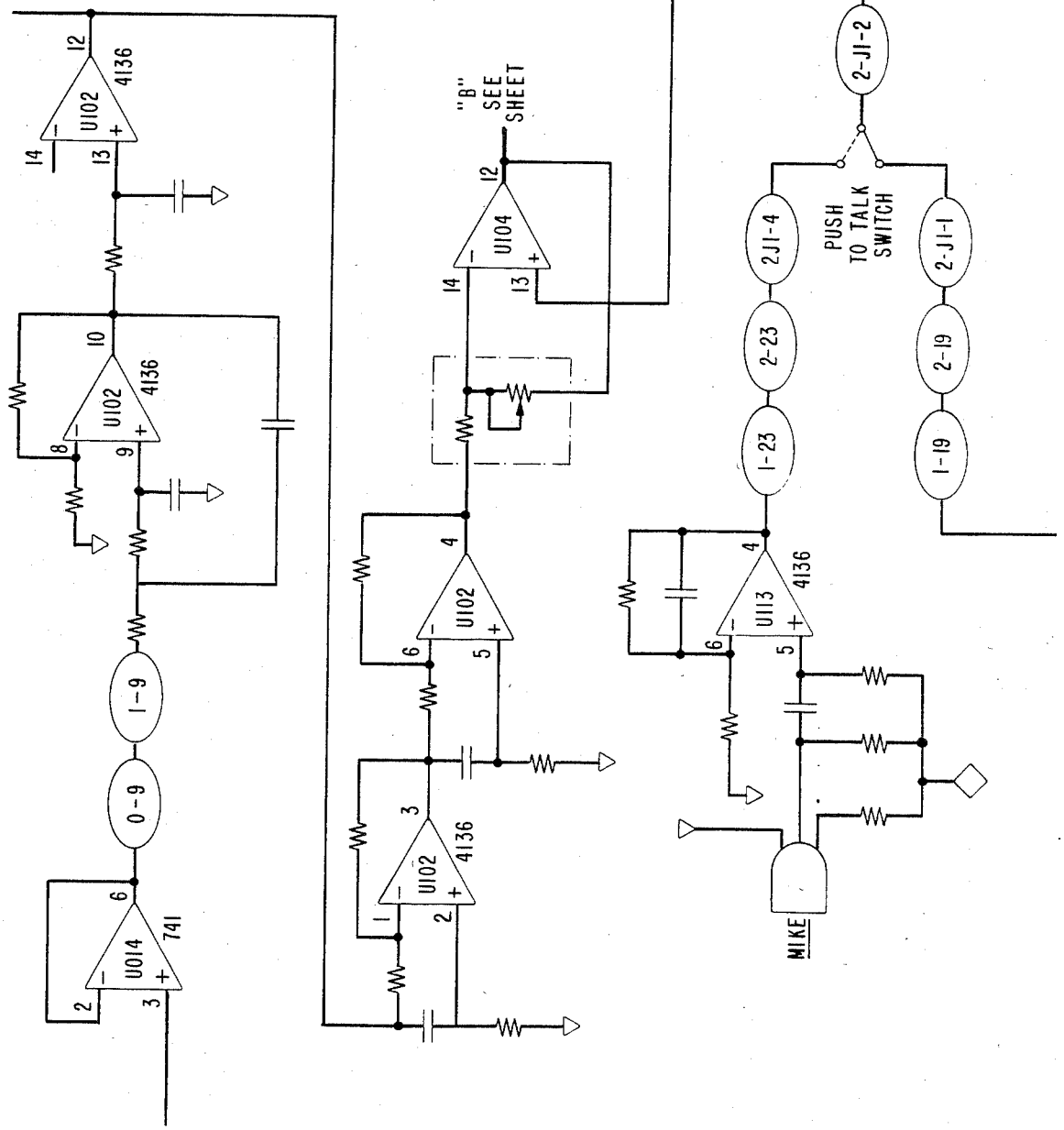
Figure 4:
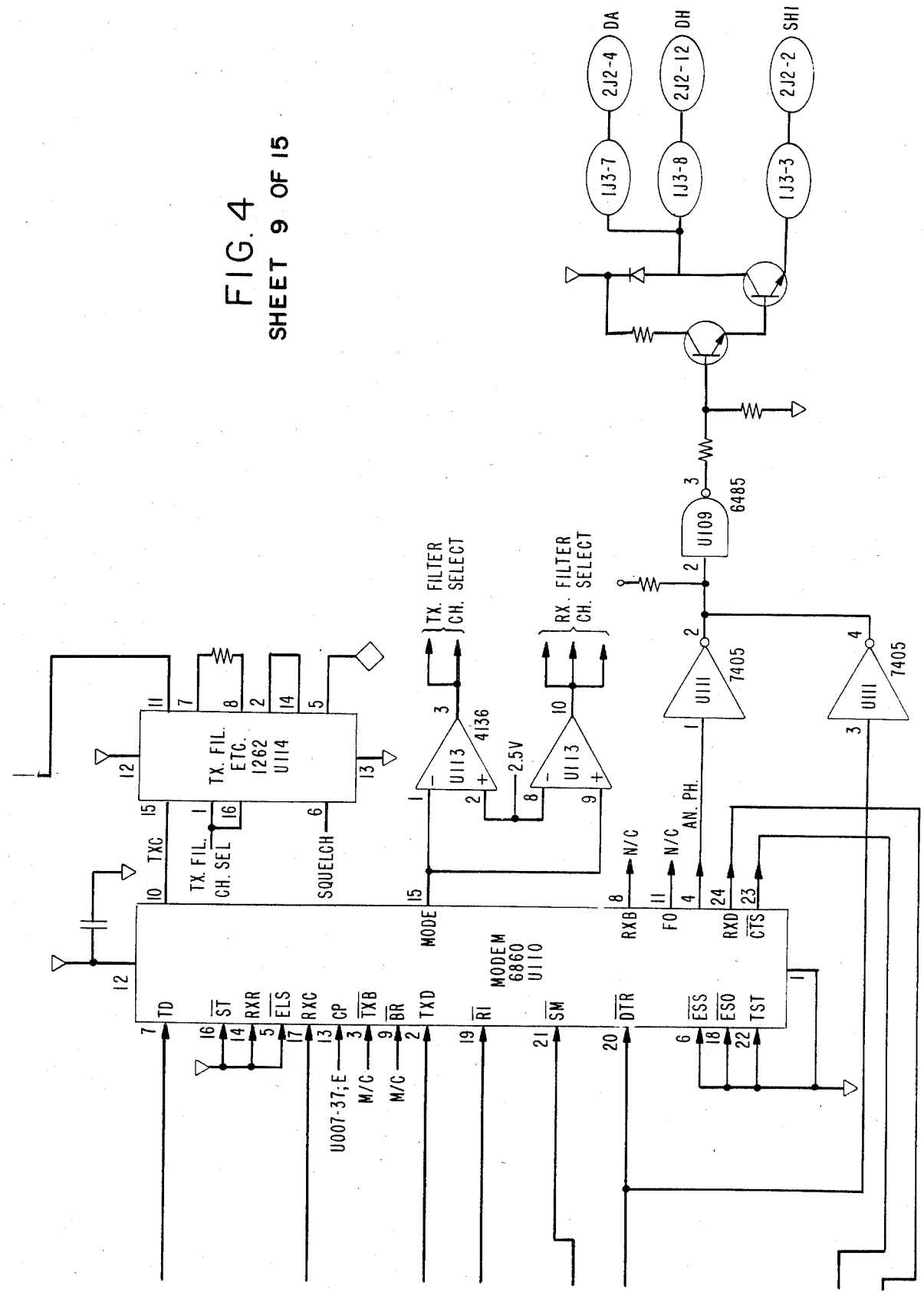
Figure 4:
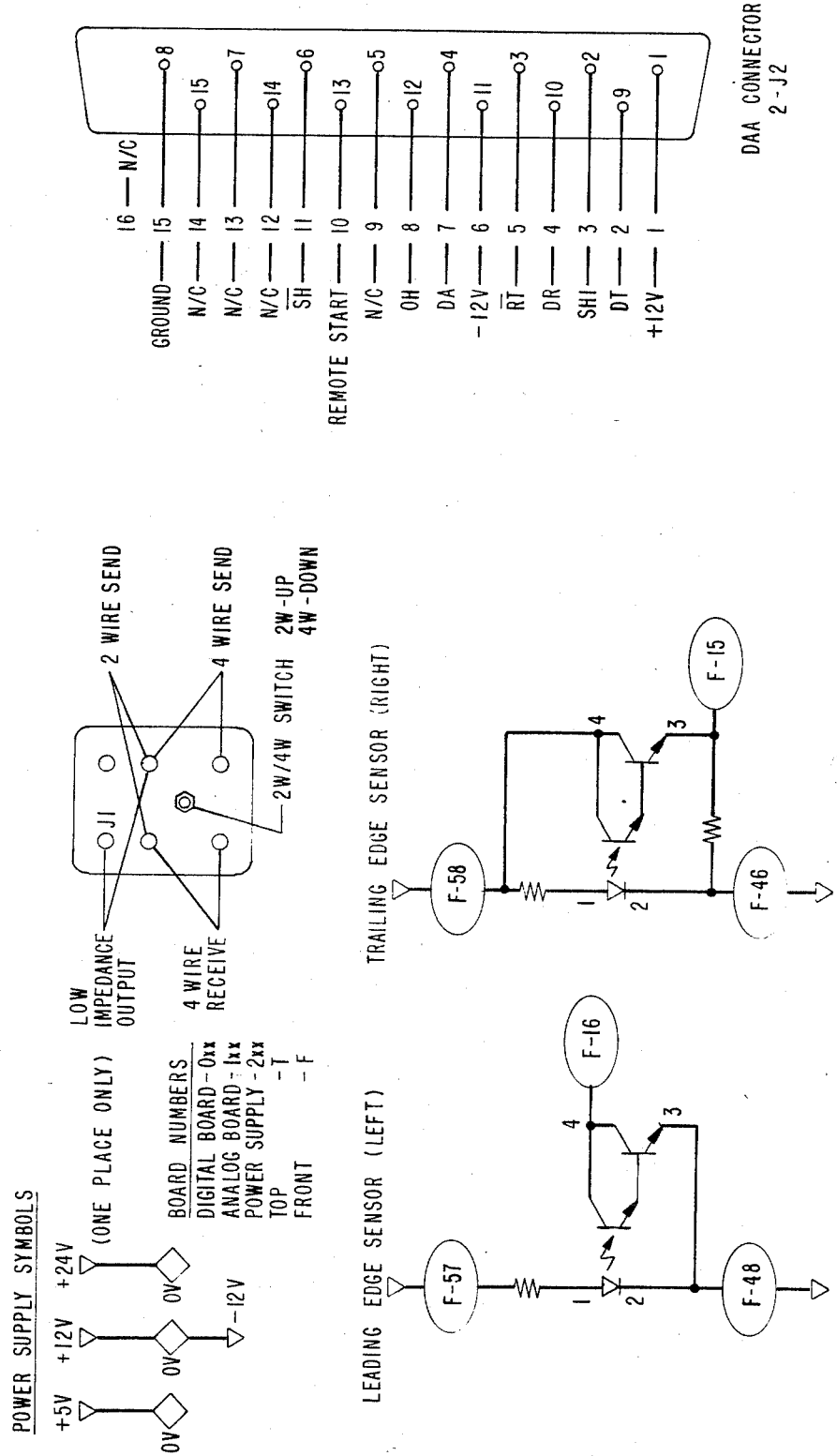
Figure 4:
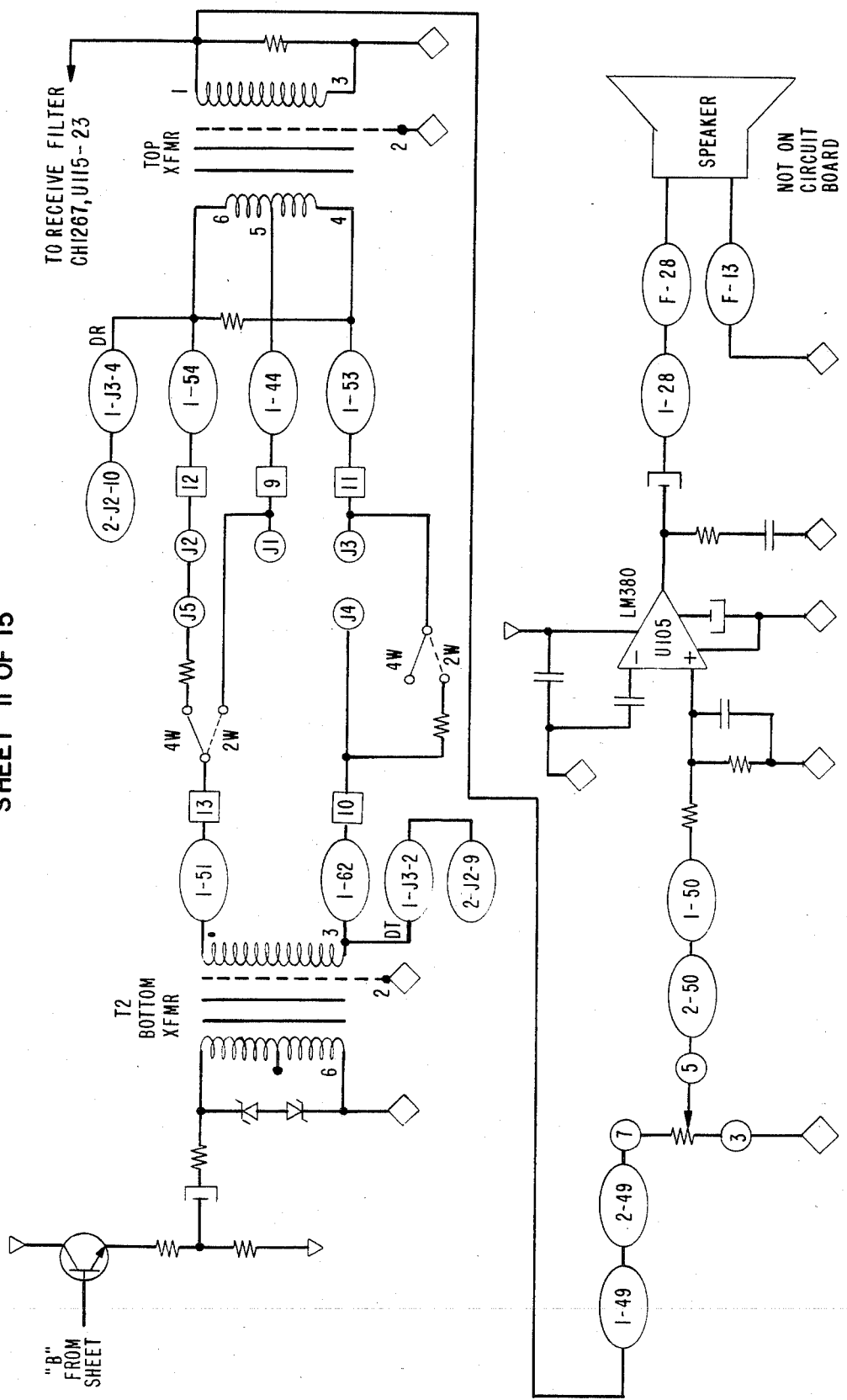
Figure 4:
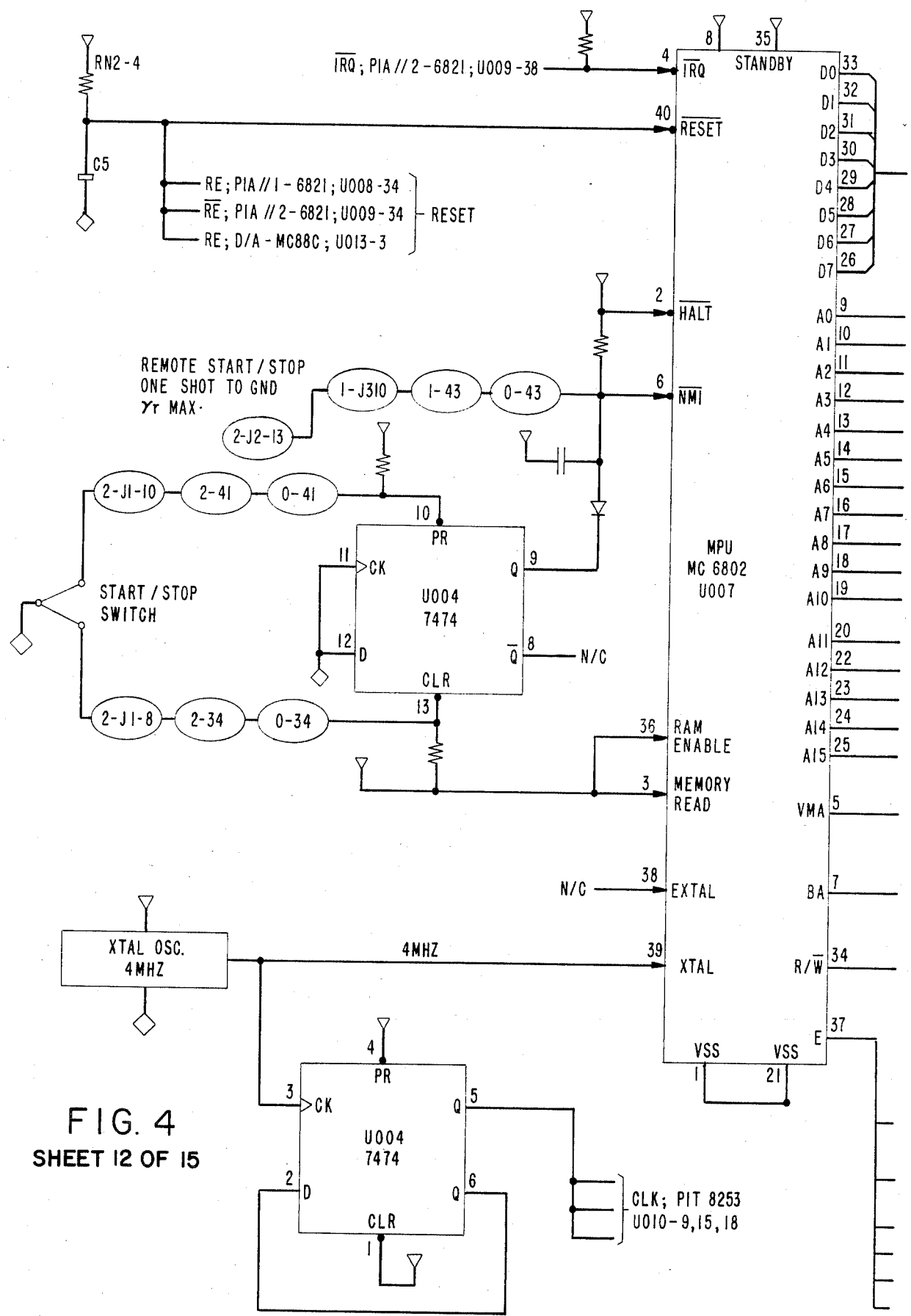
Figure 4:
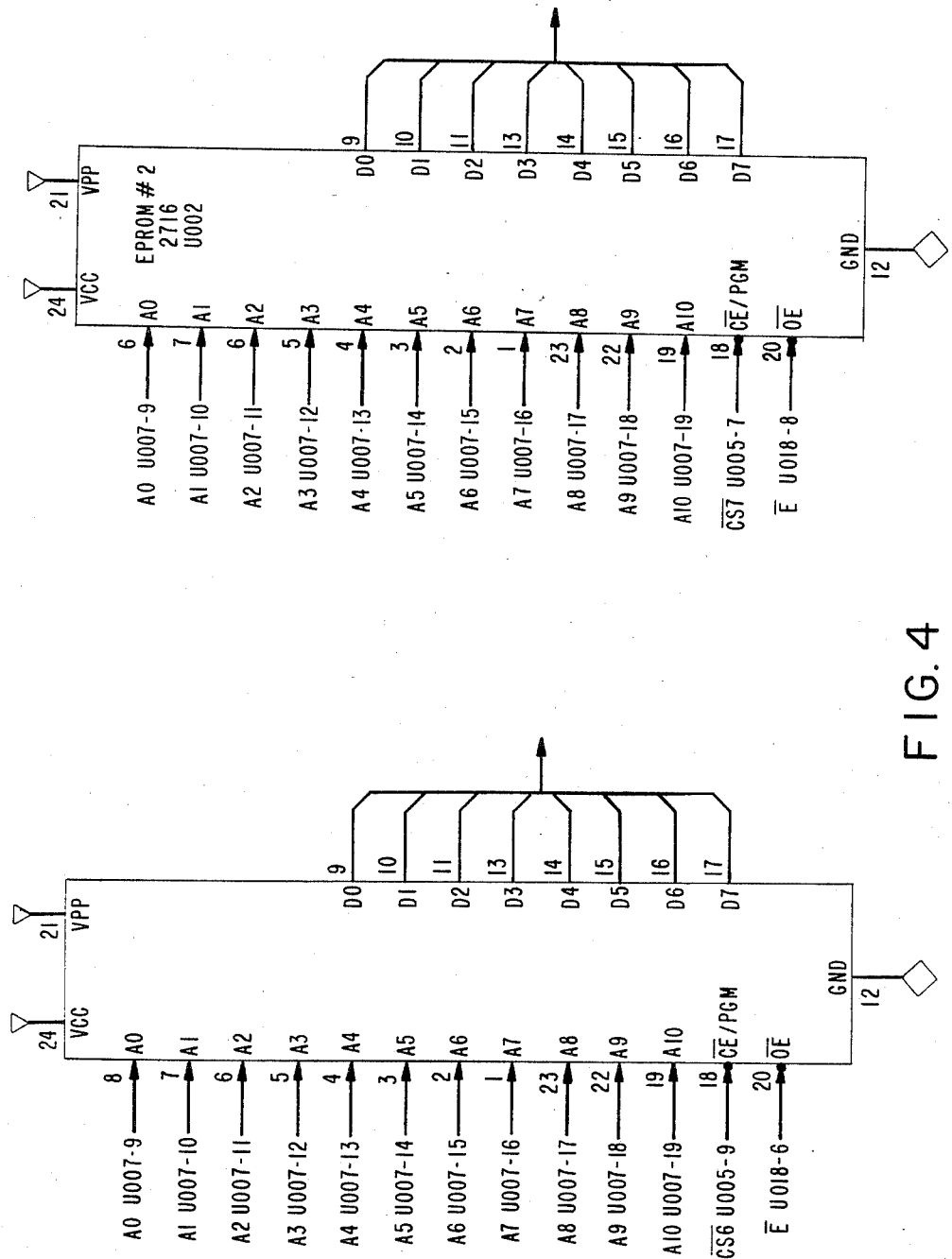
Figure 9:
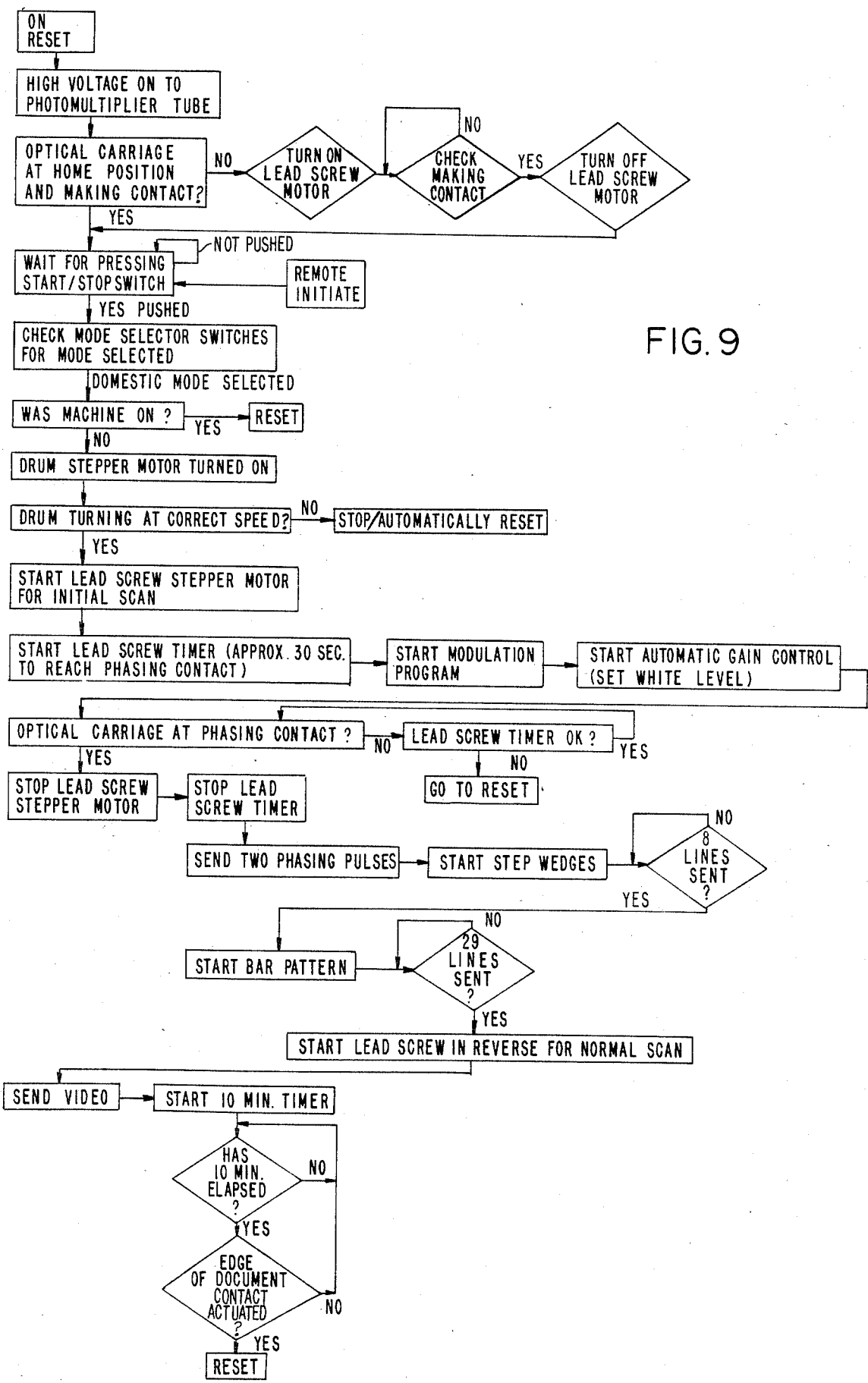
FIG. 9 is a flow chart showing the logical operation of said facsimile transmitter.

A detailed functional schematic diagram of the transmitter unit 10 appears in FIG. 4, in which the small ovals in various signal lines merely designate test points.

The transmission scan of the document or picture on the surface of the drum 13 may be terminated at any time by pressing the transmit start/stop button 23. During normal operation the transmission sequence is terminated when the optical carriage 18 engages the edge of document sensor/indicator 17, to cause the limit switch of said sensor to terminate transmission. Alternatively, as previously discussed, the coupling of the video signal to the telephone lines 41 is automatically terminated in the event of a malfunction as determined by (i) an excessively long initial or fast scan time, (ii) an excessively long video transmission time, or (iii) improper drum rotation speed.

We claim:

1. A facsimile transmitter for sending a signal comprising video information to a remote receiver via a transmission means, for reproduction on a record medium, said transmitter comprising:

a rotatable cylindrical drum;

drum drive means for rotating said drum at a predetermined speed;

means for affixing a sheet to the cylindrical surface of said drum, said sheet having optically readable information to be transmitted disposed thereon, said means for affixing a sheet comprising:

a fixed clamp extending longitudinally of said drum, a first clamp position indicating member secured in a predetermined position on said drum with respect to said fixed clamp, and a movable clamp extending longitudinally of said drum, mounted for rotation about the longitudinal axis of said drum, and including a second clamp position indicating member;

stationary sensing means coupled to each of said clamp position indicating members for generating (i) a fixed clamp position signal each time said first clamp position indicating member traverses a first given point and (ii) a movable clamp position indicating signal each time said second clamp position indicating member traverses a second given point;

an optical carriage disposed adjacent said drum for movement along a line parallel to the longitudinal axis thereof, said optical carriage including optical means for scanning the surface of said drum and said sheet affixed thereto;

carriage drive means for causing said optical carriage to translate along said line at a desired linear speed;

a photodetector coupled to said optical means for converting the information on said sheet to a video signal, the video signal output range of said photodetector being determined by the amplitude of a video range bias signal applied thereto;

video level setting means coupled to said carriage drive means and said photodetector for (i) causing said carriage drive means to initially scan along said line from a position adjacent one end of said drum to a position adjacent the other end thereof, (ii) determining the peak value of said video signal during said initial scan, and (iii) setting the amplitude of said video range bias signal in response to said peak value of said video signal, so that the peak value of said video signal is maintained within a predetermined range;

scan control means operative after termination of the operation of said video level setting means for causing said carriage drive means to scan along said line; and means for coupling said video signal to said transmission means.

2. The transmitter according to claim 1, further comprising drum speed monitoring means responsive to at least one of said clamp position signals for generating a drum speed signal indicative of the speed of rotation of the drum, said drum speed monitoring means including means operative after an initial startup period and responsive to said drum speed signal for terminating the coupling of said video signal to said transmission means when the speed of rotation of said drum is different from said predetermined speed.

3. The transmitter according to claim 1, further comprising video centering means responsive to both of said clamp position signals for generating a video synchronization control signal to synchronize the reproduction of said video signal at said remote receiver so that the information reproduced on said record medium at said remote receiver, corresponding to said information on said sheet, is centered on said record medium.

4. The transmitter according to claim 3, further comprising video processing means for combining said video signal from said photodetector with said video synchronization signal to form a composite video signal, and for modulating said composite video signal; and means operatively associated with said video processing means for coupling the modulated composite video signal to said transmission means.

5. A facsimile transmitter for sending a signal comprising video information to a remote receiver via a transmission means, for reproduction on a record medium, said transmitter comprising:

a rotatable cylindrical drum;

drum drive means for rotating said drum at a predetermined speed;

means for affixing a sheet to the cylindrical surface of said drum, said sheet having optically readable information to be transmitted disposed thereon, said affixing means comprising:
  a first clamp extending longitudinally of said drum; and
  a second clamp extending longitudinally of said drum and including a second clamp position indicating member;

a first clamp position indicating member secured in a predetermined position on said drum with respect to said first clamp;

an optical carriage disposed adjacent said drum for movement along a line parallel to the longitudinal axis thereof, said optical carriage including optical means for scanning the surface of said drum and said sheet affixed thereto;

carriage drive means for causing said optical carriage to translate along said line at a desired linear speed;

a photodetector coupled to said optical means for converting the information on said sheet to a video signal;

sensing means coupled to each of said clamp position indicating members for generating (i) a first clamp position signal each time said first clamp position indicating member traverses a first given point and (ii) a second clamp position indicating signal each time said second clamp position indicating member traverses a second given point;

video centering means responsive to both of said clamp position signals for generating a video synchronization control signal to synchronize the reproduction of said video signal at said remote receiver so that the information reproduced on said record medium at said remote receiver, corresponding to said information on said sheet, is centered on said record medium;

video processing means for combining said video signal from said photodetector with said video synchronization signal to form a composite video signal; and means operatively associated with said video processing means for coupling the composite video signal to said transmission means.

6. The transmitter according to claim 5, wherein said first clamp is fixed and said second clamp is movable.

7. The transmitter according to claim 6, wherein said second clamp is mounted for rotation about the longitudinal axis of said drum.

8. The transmitter according to claim 5, further comprising drum speed monitoring means responsive to at least one of said clamp position signals for generating a drum speed signal indicative of the speed of rotation of the drum, said drum speed monitoring means including means operative after an initial startup period and responsive to said drum speed signal for terminating the coupling of said composite video signal to said transmission means when the speed of rotation of said drum is different from said predetermined speed.

9. The transmitter according to claim 5, wherein the video signal output range of said photodetector is determined by the amplitude of a video range bias signal applied thereto, further comprising:

video level setting means coupled to said carriage drive means and said photodetector for (i) causing said carriage drive means to initially scan along said line from a position adjacent one end of said drum to a position adjacent the other end thereof in a given direction at a relatively high video level monitoring speed, (ii) determining the peak value of said video signal during said initial scan, and (iii) setting the amplitude of said video range bias signal in response to said peak value of said video signal, so that the peak value of said video signal is maintained within a predetermined range; and scan control means operative after termination of the operation of said video level setting means for causing said carriage drive means to scan along said line from a position adjacent said other end of said drum to a position adjacent said one end thereof in a direction opposite to said given direction at a relatively low video transmission scanning speed.

10. A facsimile transmitter for sending a signal comprising video information to a remote receiver via a transmission means, for reproduction on a record medium, said transmitter comprising:

a rotatable cylindrical drum;

drum drive means for rotating said drum at a predetermined speed;

means for affixing a sheet to the cylindrical surface of said drum, said sheet having optically readable information to be transmitted disposed thereon;

an optical carriage disposed adjacent said drum for movement along a line parallel to the longitudinal axis thereof, said optical carriage including optical means for scanning the surface of said drum and said sheet affixed thereto;

carriage drive means for causing said optical carriage to translate along said line at a desired linear speed;

a photodetector coupled to said optical means for converting the information on said sheet to a video signal having a peak value corresponding to the brightest part of said sheet;

scan control means for causing said carriage drive means to scan along said line;

means for coupling said video signal to said transmission means; and drum speed monitoring means for generating a drum speed signal indicative of the speed of rotation of the drum, said drum speed monitoring means including means operative after an initial startup period and responsive to said drum speed signal for terminating the coupling of said video signal to said transmission means when the speed of rotation of said drum is different from said predetermined speed.

11. The transmitter according to claim 10, further comprising means operatively associated with said carriage drive means for monitoring the time required for said optical carriage to traverse said line, and for terminating the coupling of said video signal to said transmission means when said time exceeds a preset maximum permissible scan time.

12. The transmitter according to claim 10, wherein said means for affixing said sheet to said drum comprises:

a fixed clamp extending longitudinally of said drum; and a movable clamp extending longitudinally of said drum, mounted for rotation about the longitudinal axis of said drum, and including a first clamp position indicating member;

further comprising a second clamp position indicating member secured in a predetermined position on said drum with respect to said fixed clamp.

13. The transmitter according to claim 12, further comprising stationary sensing means coupled to each of said clamp position indicating members for generating (i) a fixed clamp position signal each time said second clamp position indicating member traverses a first given point and (ii) a movable clamp position indicating signal each time said first clamp position indicating member traverses a second given point.

14. The transmitter according to claim 13, wherein said drum speed monitoring means is responsive to at least one of said clamp position signals.

15. The transmitter according to claim 14, wherein the video signal output range of said photodetector is determined by the amplitude of a video range bias signal applied thereto, further comprising:

video level setting means coupled to said carriage drive means and said photodetector for (i) causing said carriage drive means to initially scan along said line from a position adjacent one end of said drum to a position adjacent the other end thereof in a given direction at a relatively high video level monitoring speed, (ii) determining the peak value of said video signal during said initial scan, and (iii) setting the amplitude of said video range bias signal in response to said peak value of said video signal, so that the peak value of said video signal is maintained within a predetermined range.

16. The transmitter according to claim 13, further comprising:

video centering means responsive to both of said clamp position indicating signals for generating video synchronization control signals to synchronize the reproduction of said video signal at said remote receiver so that the information reproduced on said record medium at said remote receiver, corresponding to said information on said sheet, is centered on said record medium.

17. The transmitter according to claim 16, further comprising video processing means for combining said video signal from said photodetector with said video synchronization control signals to form a composite video signal, for modulating said composite video signal, and for coupling the modulated composite video signal to said transmission means.

18. The transmitter according to claim 1, 5 or 10, further comprising three optical filters, and means for selectively interposing each of said filters between said optical means and said photodetector.

19. The transmitter according to claim 1, 5 or 10, further comprising means for coupling to said transmission means a coded signal identifying the particular transmitter involved.

20. The transmitter according to claim 1, 5 or 10, further comprising manually settable means for coupling to said transmission means a coded signal identifying the place at which said transmitter is located.

21. The transmitter according to claim 1, 5 or 10, further comprising means responsive to a start-up signal from said remote receiver for beginning the coupling of said video signal to said transmission means.

22. The transmitter according to claim 1, 5 or 10, further comprising companding means for compressing the dynamic range of said video signal according to a logarithmic function.

23. The transmitter according to claim 1, 5 or 10, further comprising companding means for compressing the dynamic range of said video signal according to a square root function.

24. The transmitter according to claim 1, 5 or 10, further comprising means for transmitting audio information to said transmission means.

25. The transmitter according to claim 1, 9 or 15, wherein said video level setting means includes a DC to DC converter for setting the amplitude of said video range bias signal.

26. The transmitter according to claim 4, further comprising means for monitoring the duration of said video signal and for terminating the coupling of said modulated composite video signal to said transmission means when the duration of said video signal exceeds a maximum permissible preset transmission time.

27. The transmitter according to claim 1, 5 or 10, wherein said drum drive means and said carriage drive means each includes a stepper motor, and means for supplying pulses to each stepper motor at a rate corresponding to the desired speed of rotation thereof.

28. The transmitter according to claim 1, 9 or, wherein said carriage drive means comprises (i) a draw cable for moving said carriage at said relatively high speed in response to said video level setting means, (ii) a lead screw, and (iii) means for engaging said optical carriage with said lead screw adjacent said other end of said drum for moving said carriage at said relatively low speed in response to said scan control means.

29. The transmitter according to claim 1, 5 or 10, wherein said optical means comprises an optical fiber cable.

30. The transmitter according to claim 4, 5 or 17, wherein said video processing means comprises digital means for modulating said video signal.

31. A facsimile transmitter for sending a signal comprising video information to a remote receiver via a transmission means, for reproduction on a record medium, said transmitter comprising:

a rotatable cylindrical drum;

drum drive means for rotating said drum at a predetermined speed;

means for affixing a sheet to the cylindrical surface of said drum, said sheet having optically readable information to be transmitted disposed thereon, said affixing means comprising:

a fixed clamp extending longitudinally of said drum; and a movable clamp extending longitudinally of said drum, mounted for rotation about the longitudinal axis of said drum, and including a second clamp position indicating member;

a first clamp position indicating member secured in a predetermined position on said drum with respect to said fixed clamp;

an optical carriage disposed adjacent said drum for movement along a line parallel to the longitudinal axis thereof, said optical carriage including an optical conduit for scanning the surface of said drum and said sheet affixed thereto;

carriage drive means for causing said optical carriage to translate along said line at a desired linear speed;

a stationary photodetector coupled to said optical conduit for converting the information on said sheet to a video signal, the video signal output range of said photodetector being determined by the amplitude of a video range bias signal applied thereto;

video level setting means coupled to said carriage drive means and said photodetector for (i) causing said carriage drive means to initially scan along said line from a position adjacent one end of said drum to a position adjacent the other end thereof in a given direction at a relatively high video level monitoring speed, (ii) determining the peak value of said video signal during said initial scan, and (iii) setting the amplitude of said video range bias signal in response to said peak value of said video signal, so that the peak value of said video signal is maintained within a predetermined range;

scan control means operative after termination of the operation of said video level setting means for causing said carriage drive means to scan along said line from a position adjacent said other end of said drum to a positiion adjacent said one end thereof in a direction opposite to said given direction at a relatively low video transmission scanning speed;

stationary sensing means coupled to each of said clamp position indicating members for generating (i) a fixed clamp position signal each time said first clamp position indicating member traverses a first given point and (ii) a movable clamp position indicating signal each time said second clamp position indicating member traverses a second given point;

video centering means responsive to both of said clamp position signals for generating video synchronization control signals to synchronize the reproduction of said video signal at said remote receiver so that the information reproduced on said record medium at said remote receiver, corresponding to said information on said sheet, is centered on said record medium;

video processing means for combining said video signal from said photodetector with said video synchronization signals to form a composite video signal, and for modulating said composite video signal;

means operatively associated with said video processing means for coupling the modulated composite video signal to said transmission means; and drum speed monitoring means responsive to at least one of said clamp position signals for generating a drum speed signal indicative of the speed of rotation of the drum, said drum speed monitoring means including means operative after an initial startup period and responsive to said drum speed signal for terminating the coupling of said modulated composite video signal to said transmission means when the speed of rotation of said drum is different from said predetermined speed.

32. The transmitter according to claim 31, further comprising three optical filters, and means for selectively interposing each of said filters between said optical conduit and said photoconductor.

33. The transmitter according to claim 31, further comprising means for coupling to said transmission means a coded signal identifying the particular transmitter involved.

34. The transmitter according to claim 31, further comprising manually settable means for coupling to said transmission means a coded signal identifying the place at which said transmitter is located.

35. The transmitter according to claim 31, further comprising means responsive to a start-up signal from said remote receiver for beginning the coupling of said modulated composite video signal to said transmission means.

36. The transmitter according to claim 31, wherein said video level setting means includes a DC to DC converter for setting the amplitude of said video range bias signal.

37. The transmitter according to claim 31, further comprising companding means for compressing the dynamic range of said video signal according to a logarithmic function.

38. The transmitter according to claim 31, further comprising companding means for compressing the dynamic range of said video signal according to a square root function.

39. The transmitter according to claim 31, further comprising means for transmitting audio information to said transmission means.

40. The transmitter according to claim 31, further comprising means for monitoring the duration of said video signal and for terminating the coupling of said modulated composite video signal to said transmission means when the duration of said video signal exceeds a preset maximimum permissible time.

41. The transmitter according to claim 31, wherein said drum drive means and said carriage drive means each includes a stepper motor, and means for supplying pulses to each stepper motor at a rate corresponding to the desired speed of rotation thereof.

42. The transmitter according to claim 31, wherein said carriage drive means comprises (i) a draw cable for moving said carriage at said relatively high speed in response to said video level setting means, (ii) a lead screw, and (iii) means for engaging said optical carriage with said lead screw adjacent said other end of said drum for moving said carriage at said relatively low speed in response to said scan control means.

43. The transmitter according to claim 31, wherein said optical conduit comprises an optical fiber cable.

44. The transmitter according to claim 31, wherein said video processing means comprises digital means for modulating said video signal.

45. A facsimile transmitter for sending a signal comprising video information to a remote receiver via a transmission means, for reproduction on a record medium, said transmitter comprising:
   a rotatable cylindrical drum;
   drum device means for rotating said drum at a predetermined speed;
   means for affixing a sheet to the cylindrical surface of said drum, said sheet having optically readable information to be transmitted disposed thereon, said affixing means comprising:
      a first clamp disposed on and extending longitudinally of said drum; and
      a second clamp disposed on and extending longitudinally of said drum, and being mounted for rotation about the longitudinal axis of said drum, so that said second clamp is at all times maintained parallel to said drum surface and said first clamp; and
   optical means disposed adjacent said drum for scanning the surface of said drum and said sheet affixed thereto.

46. The transmitter according to claim 45, wherein said first clamp is affixed to said drum and is immovable with respect thereto.

47. The transmitter according to claim 45, further comprising counterweight means connected to said second clamp for rotation therewith, for balancing the weight of said second clamp with respect to said drum axis.

48. The transmitter according to claim 45, 46 or 47, wherein said drum has a pair of spaced circumferential grooves in the surface thereof, further comprising a rotatable ring disposed in each of said grooves, said second clamp being secured to both of said rings.

49. A facsimile transmitter for sending a signal comprising video information to a remote receiver via a transmission means, for reproduction on a record medium, said transmitter comprising:
   a rotatable cylindrical drum, said drum having a pair of spaced circumferential grooves in the surface thereof;
   drum drive means for rotating said drum at a predetermined speed;
   means for affixing a sheet to the cylindrical surface of said drum, said sheet having optically readable information to be transmitted disposed thereon, said affixing means comprising:
      a first clamp disposed on and extending longitudinally of said drum, said first clamp being affixed to said drum and immovable with respect thereto;
      a pair of rotatable rings, one of said rings being disposed in each of said grooves;
      a second clamp disposed on and extending longitudinally of said drum, and being mounted for rotation about the longitudinal axis of said drum, so that said second clamp is at all times maintained parallel to said drum surface and said first clamp, said second clamp being secured to both of said rings; and
   counterweight means connected to said second clamp for rotation therewith, for balancing the weight of said second clamp with respect to said drum axis; and
   optical means disposed adjacent said drum for scanning the surface of said drum and said sheet affixed thereto.

50. For use in a facsimile transmitter for sending a signal comprising video information to a remote receiver via a transmission means, for reproduction on a record medium, a drum assembly comprising:
   a rotatable cylindrical drum, said drum having a pair of spaced circumferential grooves in the surface thereof;
   means for affixing a sheet to the cylindrical surface of said drum, said sheet having optically readable information to be transmitted disposed thereon, said affixing mean comprising;
      a first clamp disposed on and extending longitudinally of said drum, said first clamp being affixed to said drum and immovable with respect thereto;
      a pair of rotatable rings, one of said rings being disposed in each of said grooves;
      a second clamp disposed on and extending longitudinally of said drum, and being mounted for rotation about the longitudinal axis of said drum, so that said second clamp is at all times maintained parallel to said drum surface and said first clamp, said second clamp being secured to both of said rings; and
   counterweight means connected to said second clamp for rotation therewith, for balancing the weight of said second clamp with respect to said drum axis.

51. A facsimile transmitter for sending a signal comprising video information to a remote receiver via a transmission means, for reproduction on a record medium, said transmitter comprising:
   a sheet support member;
   means for affixing a sheet to said support member, said sheet having optically readable information to be transmitted disposed thereon;
   optical means including a photodetector for converting the information on said sheet to a video signal;
   scan control means for causing said optical means to scan said sheet;
   position determining means operatively associated with said support member and said optical means for determining the position of two opposite edges of said sheet with respect to said support member, said position determining means comprising:
   first and second clamps for securing said edges of said sheet to said support member, at least one of said clamps being movable,
   first and second clamp position indicating members disposed at predetermined positions with respect to said first and second clamps respectively, and sensing means coupled to each of said clamp position indicating members for generating corresponding clamp position indicating signals;

means for coupling the video signal generated by said optical means during said scan to said transmission means; and video centering means responsive to an output of said position determining means for providing a video synchronization control signal to said transmission means, so that the information reproduced on said record medium at said remote receiver, corresponding to the information on said sheet, is centered on said record medium.

52. The transmitter according to claim 51, further comprising means for combining said video synchronization control signal with said video signal to provide a composite video signal for coupling to said transmission means.

53. A facsimile transmitter for sending a signal comprising video information to a remote receiver via a transmission means, for reproduction on a record medium, said transmitter comprising:

a sheet support member;

means for affixing a sheet to said support member, said sheet having optically readable information to be transmitted disposed thereon;

optical means including a movable scan portion and a photodetector for converting the information on said sheet to a video signal;

scan control means for causing said optical means to scan said sheet disposed on said support member, at a predetermined relative speed of movement between said support member and said scan portion of said optical means;

means for coupling the video signal generated by said optical means during said scan to said transmission means; and speed monitoring means for measuring said relative speed and terminating the coupling of said video signal to said transmission means when said relative speed deviates from the predetermined value thereof.

54. The transmitter according to claim 53, further comprising means for measuring the duration of said scan and for terminating the coupling of said video signal to said transmission means when said scan duration exceeds a preset maximum permissible value thereof.

55. The transmitter according to claim 53, further comprising means for rendering said speed monitoring means operative after an initial startup period.

56. The transmitter according to claim 5 further comprising means for monitoring the duration of said video signal and for terminating the coupling of said composite video signal to said transmission means when the duration of said video signal exceeds a maximum permissible preset transmission time.

* * * * *